(12) United States Patent
Takeda et al.

(10) Patent No.: US 12,063,688 B2
(45) Date of Patent: Aug. 13, 2024

(54) TERMINAL, RADIO COMMUNICATION METHOD, AND SYSTEM FOR A RANDOM ACCESS PROCEDURE IN COMMUNICATION USING BEAM FORMING

(71) Applicant: NTT DOCOMO, INC., Tokyo (JP)

(72) Inventors: Kazuaki Takeda, Tokyo (JP); Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/337,563

(22) PCT Filed: Sep. 29, 2017

(86) PCT No.: PCT/JP2017/035386
§ 371 (c)(1),
(2) Date: Mar. 28, 2019

(87) PCT Pub. No.: WO2018/062456
PCT Pub. Date: Apr. 5, 2018

(65) Prior Publication Data
US 2019/0350001 A1 Nov. 14, 2019

(30) Foreign Application Priority Data
Sep. 29, 2016 (JP) .................. 2016-192334

(51) Int. Cl.
*H04W 74/0833* (2024.01)
*H04B 7/06* (2006.01)
(Continued)

(52) U.S. Cl.
CPC ...... *H04W 74/0833* (2013.01); *H04B 7/0617* (2013.01); *H04W 72/046* (2013.01); *H04B 7/0413* (2013.01)

(58) Field of Classification Search
CPC ........... H04W 74/0833; H04W 72/046; H04W 16/28; H04W 74/004; H04B 7/0617; H04B 7/0413; H04B 7/088; H04B 7/0695
See application file for complete search history.

(56) References Cited

U.S. PATENT DOCUMENTS 10,278,160 B2 * 4/2019 Agiwal ................ H04B 7/0617
2011/0019694 A1 1/2011 Kwon et al.
(Continued)

FOREIGN PATENT DOCUMENTS

| KR | 10-2009-0100205 A | 9/2009 |
| KR | 2015-0000304 A | 1/2015 |
| WO | 2015/166840 A1 | 11/2015 |

OTHER PUBLICATIONS

Samsung, TSG RAN WG1 85 R1-166785, Aug. 2016, 3GPP (Year: 2016).*

(Continued)

*Primary Examiner* — Jae Y Lee
*Assistant Examiner* — Aixa A Guadalupe Cruz
(74) *Attorney, Agent, or Firm* — Osha Bergman Watanabe & Burton LLP

(57) ABSTRACT

To properly receive a preamble and/or a message in a random access procedure in communication using beam forming, and perform random access with efficiency, a user terminal of the present invention is a user terminal for communicating with a radio base station using a plurality of types of beam forming, and is characterized by having a receiving section that receives a DL signal transmitted from the radio base station, a transmitting section that transmits a random access preamble (PRACH), and a control section that controls to transmit the PRACH including beam information on a beam of the radio base station.

3 Claims, 17 Drawing Sheets

| BS Tx BEAM INDEX | UE Rx BEAM INDEX | PRACH SEQUENCE |
|---|---|---|
| 1 | 1 | 1 |
| 2 | 1 | 2 |
| 3 | 1 | 3 |
| 1 | 2 | 4 |
| 2 | 2 | 5 |
| 3 | 2 | 6 |

(51) Int. Cl.
*H04W 72/04* (2023.01)
*H04W 72/044* (2023.01)
*H04B 7/0413* (2017.01)

(56) References Cited

U.S. PATENT DOCUMENTS

| | | | | |
|---|---|---|---|---|
| 2012/0314664 | A1 | 12/2012 | Johansson et al. | |
| 2014/0169260 | A1* | 6/2014 | Nishio | H04J 3/0635 |
| | | | | 370/312 |
| 2014/0376466 | A1 | 12/2014 | Jeong et al. | |
| 2017/0048826 | A1 | 2/2017 | Kishiyama | |
| 2017/0367120 | A1* | 12/2017 | Murray | H04W 72/046 |
| 2018/0027522 | A1* | 1/2018 | Lee | H04W 72/21 |
| | | | | 370/336 |
| 2018/0212659 | A1* | 7/2018 | Xiong | H04B 7/0695 |
| 2018/0359790 | A1* | 12/2018 | Ingale | H04W 74/08 |
| 2019/0013857 | A1* | 1/2019 | Zhang | H04W 74/04 |
| 2019/0141752 | A1* | 5/2019 | Kim | H04B 7/0617 |
| 2019/0182682 | A1* | 6/2019 | Kim | H04W 74/0833 |
| 2020/0296765 | A1* | 9/2020 | Kim | H04W 74/0833 |

OTHER PUBLICATIONS

3GPP TSG RAN WG1 Meeting #86; R1-167378 "Design for RACH Procedure for NR" NTT Docomo, Inc.; Göteborg, Sweden; Aug. 22-26, 2016 (4 pages).
3GPP TSG RAN WG1 Meeting #86; R1-166419 "Beamformed Random Access in NR" ZTE; Gothenburg, Sweden; Aug. 22-26, 2016 (8 pages).
Extended European Search Report issued in European Application No. 17856405.0, dated Mar. 20, 2020 (12 pages).
International Search Report issued in PCT/JP2017/035386 mailed on Dec. 19, 2017 (2 pages).
Written Opinion of the International Searching Authority issued in PCT/JP2017/035386 mailed on Dec. 19, 2017 (4 pages).
Samsung; "Discussion on TRP beamforming and beam management"; 3GPP TSG RAN WG1 #85, R1-166785; Gothenburg, Sweden; Aug. 22-26, 2016 (6 pages).
Samsung; "Random Access Procedure in NR"; 3GPP TSG-RAN WG2 Meeting #94, R2-163372; Nanjing, China; May 23-27, 2016 (7 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Office Action issued in European Application No. 17856405.0; Dated Apr. 13, 2021 (5 pages).
Extended European Search Report issued in European Application No. 21190275.4, dated Oct. 11, 2021 (9 pages).
Office Action in counterpart Indian Patent Application No. 201917013050 issued on Dec. 1, 2021 (8 pages).
Office Action in counterpart Korean Patent Application No. 10-2022-7019359 issued on Jun. 28, 2022 (10 pages).
Office Action in counterpart Korean Patent Application No. 10-2019-7009386 issued on Mar. 24, 2022 (8 pages).
Office Action issued in Chinese Application No. 201780070656.2; Dated Sep. 27, 2022 (14 pages).
Office Action in counterpart Korean Patent Application No. 10-2022-7019359 issued on Jan. 26, 2023 (8 pages).
Office Action issued in counterpart Korean Patent Application No. 10-2022-7019359 mailed on Jun. 27, 2023 (10 pages).
Extended European Search Report issued in European Application No. 23185529.7, mailed Oct. 18, 2023 (9 pages).
Office Action issued in counterpart Indian Patent Application No. 201917013050 mailed on Feb. 6, 2024 (3 pages).
Office Action issued in counterpart Korean Patent Application No. 10-2022-7019359 mailed on Feb. 15, 2024 (10 pages).

* cited by examiner

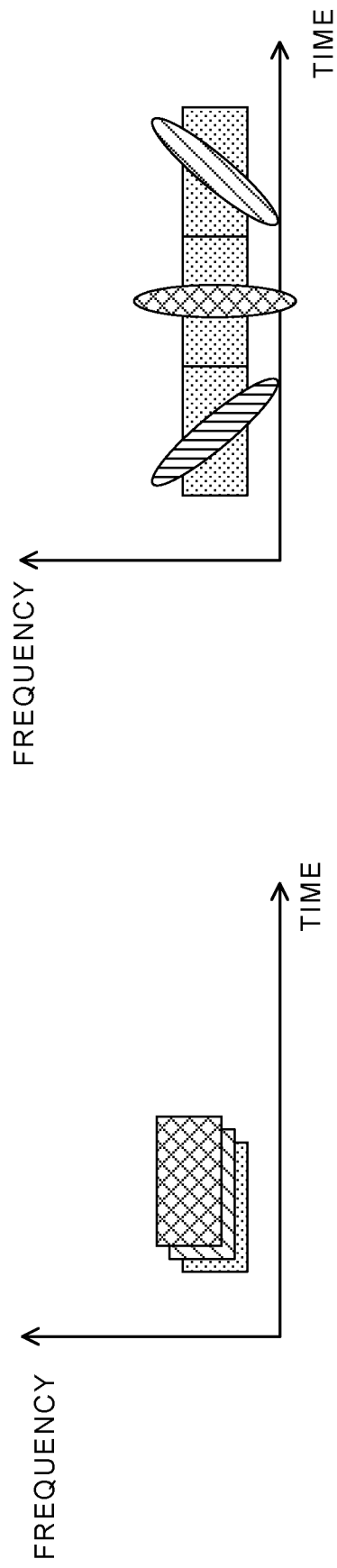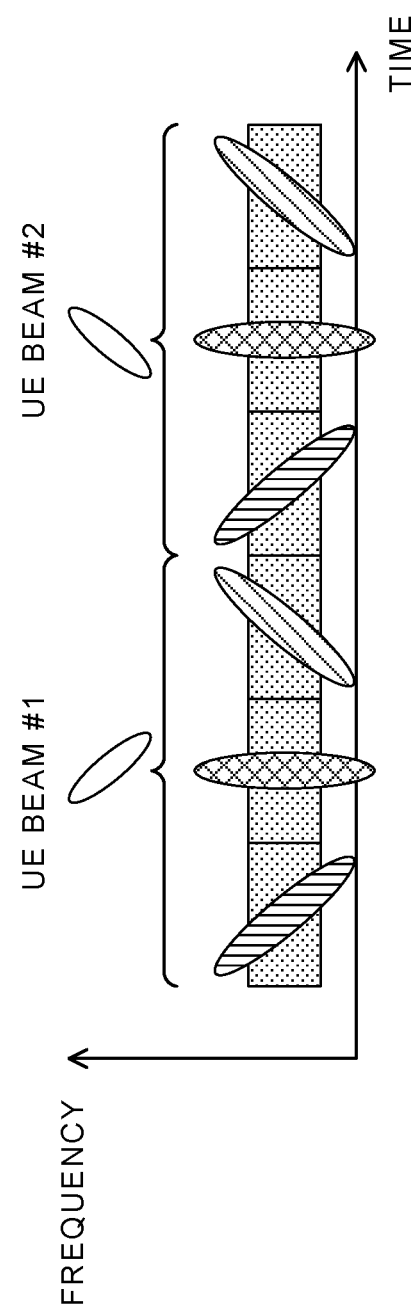

NON-APPLICATION OF Tx/Rx RECIPROCITY

APPLICATION OF Tx/Rx RECIPROCITY

| BS Tx BEAM INDEX | PRACH SF#0 | PRACH SF#1 | PRACH SF#2 | PRACH SF#3 |
|---|---|---|---|---|
| 1 | 1 | 2 | 3 | 4 |
| 2 | 2 | 3 | 4 | 1 |
| 3 | 3 | 4 | 1 | 2 |
| 4 | 4 | 1 | 2 | 3 |

FIG.7

| BS Tx BEAM INDEX | UE Rx BEAM INDEX | PRACH SEQUENCE |
|---|---|---|
| 1 | 1 | 1 |
| 2 | 1 | 2 |
| 3 | 1 | 3 |
| 1 | 2 | 4 |
| 2 | 2 | 5 |
| 3 | 2 | 6 |

FIG.10

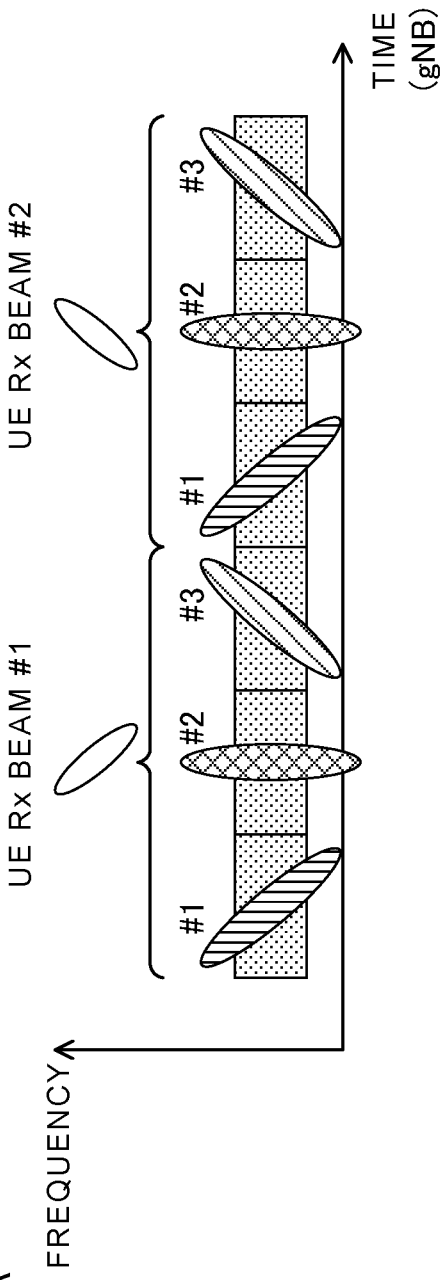
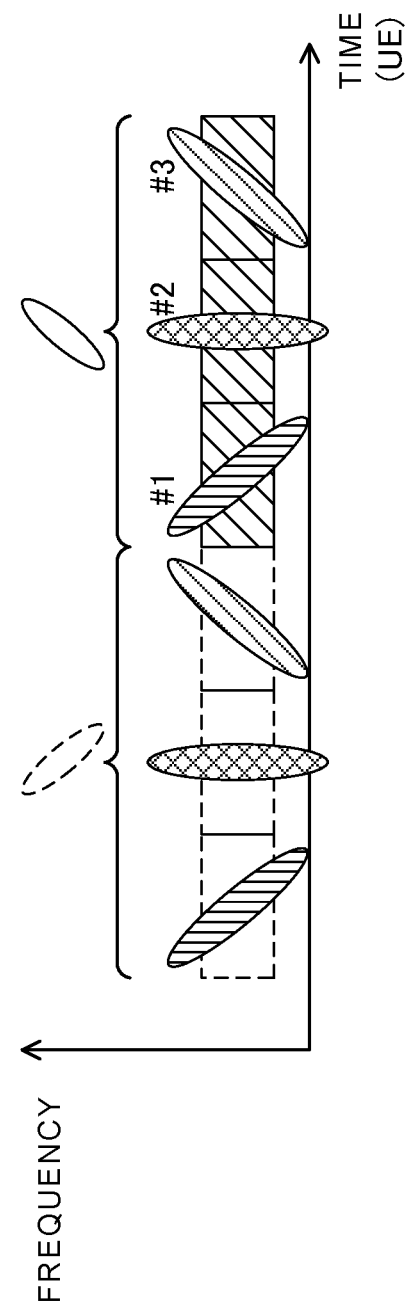

TERMINAL, RADIO COMMUNICATION METHOD, AND SYSTEM FOR A RANDOM ACCESS PROCEDURE IN COMMUNICATION USING BEAM FORMING

TECHNICAL FIELD

The present invention relates to a user terminal, radio base station and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE (also referred to as LTE Rel. 8 or 9), LTE-A (LTE-Advanced, also referred to as LTE Rel. 10, 11, or 12) has been specified, and successor systems (e.g., also referred to as FRA (Future Radio Access), 5G (5th Generation mobile communication SYSTEM), NR (New Radio), NX (New radio access), FX (Future generation radio access), LTE Rel. 13, 14 or 15 onward, etc.) to LTE have also been studied.

In LTE Rel. 10/11, in order to widen the band, introduced is Carrier Aggregation (CA) for aggregating a plurality of component carriers (CC: Component Carrier). Each CC is configured with a system band of LTE Rel. 8 as one unit. Further, in CA, a plurality of CCs of the same radio base station (eNB: eNodeB) is configured for a user terminal (UE: User Equipment).

On the other hand, in LTE Rel. 12, Dual Connectivity (DC) is also introduced where a plurality of cell groups (CG: Cell Group) of different radio base stations is configured for a UE. Each cell group is comprised of at least a single cell (CC). In DC, since a plurality of CCs of different radio base stations is aggregated, DC is also called inter-base station CA (Inter-eNB CA) and the like.

Further, in the existing LTE system (e.g., LTE Rel. 8-13), in the case where UL synchronization is established between a radio base station and a user terminal, the user terminal is capable of transmitting UL data. Therefore, in the existing LTE system, a random access procedure (also referred to as RACH procedure: Random Access Channel Procedure, access procedure) is supported to establish UL synchronization.

In the random access procedure, the user terminal acquires information (Timing Advance (TA)) on transmission timing of UL, by a response (random access response) from the radio base station in response to a randomly selected preamble (random access preamble), and establishes UL synchronization based on the TA.

After establishing UL synchronization, the user terminal receives downlink control information (DCI) (UL grant) from the radio base station, and then, using UL resources allocated by the UL grant, transmits UL data.

PRIOR ART DOCUMENT

Non-Patent Document

[Non-patent Document 1] 3GPP TS 36.300 "Evolved Universal Terrestrial Radio Access (E-UTRA) and Evolved Universal Terrestrial Radio Access Network (E-UTRAN); Overall description; Stage 2"

DISCLOSURE OF INVENTION

Problems to be Solved by the Invention

In future radio communication systems (e.g., 5G, NR), it is expected to actualize various radio communication services so as to meet respective different requirements (e.g., ultra-high speed, high capacity, ultra-low delay, etc.).

For example, in 5G, it is studied to offer radio communication services called MBB (enhanced Mobile Broad Band), IoT (Internet of Things), MTC (Machine Type Communication), M2M (Machine to Machine), URLLC (Ultra Reliable and Low Latency Communications) and the like. In addition, M2M may be called D2D (Device To Device), V2V (Vehicle To Vehicle) and the like corresponding to equipment to communicate. In order to meet requirements for above-mentioned various communications, it is studied to design new communication access technology (New RAT (Radio Access Technology)).

In 5G, for example, it is studied to offer services using maximum 100 GHz that is an extremely high carrier frequency. Generally, as the carrier frequency increases, it is more difficult to secure coverage. The reason is caused by that distance attenuation is severe to strengthen straightness of radio wave, and that the transmit power density is lowered due to ultra-wide band transmission.

Therefore, in order to meet requirements for above-mentioned various communications also in a high-frequency band, it is studied to use Massive MIMO (Massive MIMO (Multiple Input Multiple Output)) using an ultra-multi-element antenna. In the ultra-multi-element antenna, by controlling the amplitude and/or phase of a signal transmitted/received to/from each element, it is possible to form a beam (antenna directivity). The processing is also called beam forming (BF), and enables radio wave propagation loss to be reduced.

In the existing random access procedure, a plurality of actions (e.g., messages 1 to 4 in the case of contention-based random access) is specified, but it has not been determined yet how to apply BF. In the case of applying BF, it is necessary to enable the preamble and messages in the random access procedure to be received efficiently.

The present invention was made in view of such a respect, and it is an object of the invention to provide a user terminal, radio base station and radio communication method capable of properly receiving a preamble and/or a message in a random access procedure in communication using beam forming, and of performing random access with efficiency.

Means for Solving the Problem

A user terminal according to one aspect of the present invention is a user terminal for communicating with a radio base station using a plurality of types of beam forming, and is characterized by having a receiving section that receives a DL signal transmitted from the radio base station, a transmitting section that transmits a random access preamble (PRACH), and a control section that controls to transmit the PRACH including beam information on a beam of the radio base station.

Advantageous Effect of the Invention

According to the present invention, in communication using beam forming, it is possible to properly receive a preamble and/or a message in the random access procedure, and to perform random access with efficiency.

BRIEF DESCRIPTION OF DRAWINGS

FIG. 3A is a diagram showing one example single BF;

FIGS. 3B and 3C are diagrams showing one example of multiple BF;

FIG. 7 is a diagram showing another example of the table for associating BS Tx beam index with PRACH sequence;

FIG. 10 is a diagram showing a table for associating BS Tx beam index and UE Rx beam index with PRACH sequence;

FIGS. 11A and 11B are diagrams illustrating the case where Tx/Rx reciprocity is not used in Aspect 2;

BEST MODE FOR CARRYING OUT THE INVENTION

The existing LTE system (e.g., LTE Rel. 8-13) supports random access procedures to establish UL synchronization. The random access procedures include contention-based random access (also referred to as CBRA: Contention-Based Random Access, etc.) and non-contention-based random access (also referred to as Non-CBRA, Contention-Free Random Access (CFRA), etc.)

In the contention-based random access (CBRA), a user terminal transmits a preamble randomly selected from among a plurality of preambles (also referred to as the random access preamble, random access channel (PRACH: Physical Random Access Channel), RACH preamble, etc.) determined in each cell. Further, the contention-based random access is the random access procedure initiated by the user terminal, and for example, is capable of being used at the time of initial access, start or restart of UL transmission and the like.

On the other hand, in the non-contention-based random access (Non-CBRA, CFRA: Contention-Free Random Access), the radio base station assigns a preamble specific to a user terminal using the downlink (DL) control channel (PDCCH: Physical Downlink Control Channel, EPDCCH: Enhanced PDCCH and the like), and the user terminal transmits the preamble assigned by the radio base station. The non-contention-based random access is the random access procedure initiated by the network, and for example, is capable of being used at the time of handover, start or restart of DL transmission (start or restart of transmission of retransmission instruction information for DL on UL), and the like.

Figure 1:
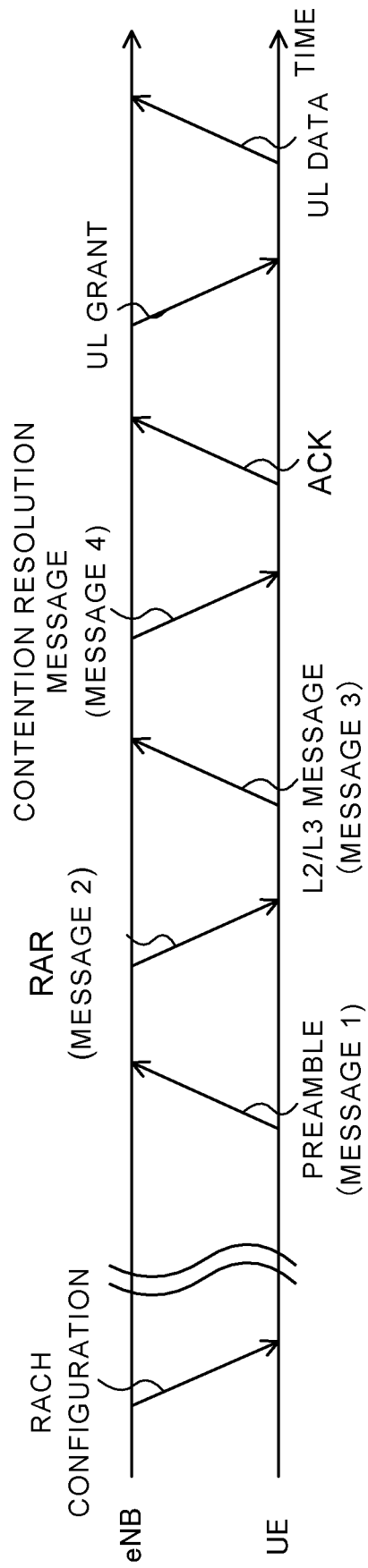
FIG. 1 is a diagram showing one example of contention-based random access procedure.

FIG. 1 is a diagram showing one example of contention-based random access. In FIG. 1, the user terminal beforehand receives information (PRACH configuration information) indicative of a configuration (PRACH configuration, RACH configuration) of the random access channel (PRACH), using system information (e.g., MIB (Master Information Block) and/or SIB (System Information Block)), and higher layer signaling (e.g., RRC (Radio Resource Control) signaling).

For example, the PRACH configuration information is capable of indicating a plurality of preambles (e.g., preamble format) determined in each cell, time resources (e.g., system frame number, sub-frame number) used in PRACH transmission, an offset (prach-Frequency Offset) indicative of a start position of frequency resources (e.g., 6 resource blocks (PRB: Physical Resource Block)) and the like.

As shown in FIG. 1, in the case where the user terminal transits from an idle (RRC IDLE) state to an RRC connected (RRC CONNECTED) state (e.g., at the time of initial access), in the case where the state is the RRC connected state, but UL synchronization is not established (e.g., at the time of start or restart of UL transmission), and the like, the user terminal selects randomly one of a plurality of preambles indicated by the PRACH configuration information, and transmits the selected preamble on the PRACH (Message 1).

Upon detecting the preamble, the radio base station transmits a Random Access Response (RAR) as a response to the preamble (Message 2). After transmitting the preamble, when the user terminal fails to receive the RAR within a predetermined period (RAR window), the terminal increases transmit power of the PRACH to transmit again (retransmit) the preamble. In addition, increasing transmit power in retransmission is also called power ramping.

The user terminal receiving the RAR adjusts transmission timing of UL, and establishes synchronization of UL, based on the timing advance (TA) included in the RAR. Further, the user terminal transmits a control message of the higher layer (L2/L3: Layer 2/Layer 3) in UL resources designated by UL grant included in the RAR (Message 3). The control message includes an identifier of the user terminal (UE-ID). For example, the identifier of the user terminal may be C-RNTI (Cell-Radio Network Temporary Identifier) in the RRC connected state, or may be UE-ID of the higher layer such as S-TMSI (System Architecture Evolution-Temporary Mobile Subscriber Identity) in the idle state.

In response to the control message of the higher layer, the radio base station transmits a contention resolution message (Message 4). The contention resolution message is transmitted based on the identifier destination of the user terminal included in the control message. The user terminal succeeding in detection of the contention resolution message transmits an acknowledgement (ACK: Acknowledge) in HARQ (Hybrid Automatic Repeat reQuest) to the radio base station. By this means, the user terminal in the idle state transits to the RRC connected state.

On the other hand, the user terminal failing to detect the contention resolution message determines that a contention arises, re-selects a preamble, and repeats the random access procedure of Messages 1 to 4. Upon detecting that the contention is resolved by ACK from the user terminal, the radio base station transmits a UL grant to the user terminal. The user terminal transmits UL data using UL resources allocated by the UL grant.

In the contention-based random access as described above, the user terminal is capable of autonomously starting the random access procedure in the case of desiring transmission of UL data. Further, since the UL data is transmitted using UL resources allocated specific to the user terminal by the UL grant after UL synchronization is established, it is possible to perform UL transmission with high reliability.

In addition, in future radio communication systems (e.g., 5G, NR), it is expected to actualize various radio communication services so as to meet respective different requirements (e.g., ultra-high speed, high capacity, ultra-low delay, and the like). For example, in the future radio communication system, as described above, it is studied to perform communication using beam forming (BF).

It is possible to classify BF into digital BF and analog BF. The digital BF is a method of performing precoding signal processing (on a digital signal) on baseband. In this case, parallel processing of Inverse Fast Fourier Transform (IFFT)/Digital to Analog Converter (DAC)/RF (Radio Frequency) is required corresponding to the number of antenna ports (RF chains). On the other hand, it is possible to form the number of beams corresponding to the number of RF chains at any timing.

The analog BF is a method using a phase shift device on RF. In this case, since it is only required to rotate the phase of the RF signal, the configuration is easy and is capable of being actualized at lost, but it is not possible to form a plurality of beams at the same timing. Specifically, in the analog BF, only one beam is capable of being formed at a time for each phase shift device.

Therefore, in the case where the base station (e.g., called eNB (evolved Node B), BS (Base Station), etc.) has only one phase shift device, the number of beams capable of being formed at certain time is "1". Accordingly, in the case of transmitting a plurality of beams using only the analog BF, since it is not possible to transmit at the same time in the same resource, it is necessary to switch or rotate the beam temporally.

In addition, it is also possible to make a hybrid BF configuration with the digital BF and analog BF combined. In the future radio communication system (e.g., 5G), it is studied to introduce massive MIMO, and when beam forming with the enormous number of beams is performed only by the digital BF, the circuit configuration is expensive. Therefore, it is expected to use the hybrid BF configuration in 5G.

Figure 2B:
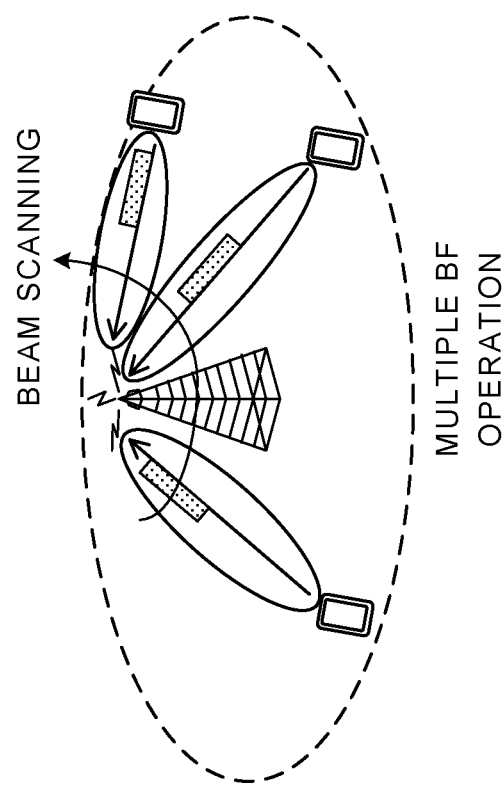
FIG. 2B is a diagram showing one example of multiple BF.
Figure 2A:
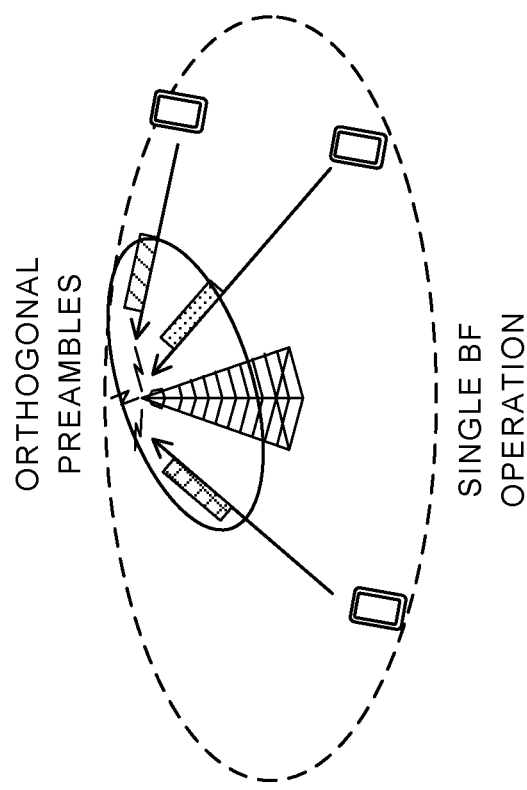
FIG. 2A is a diagram showing one example of single BF.

As BF operation, there is single BF operation using one BF, and multiple BF operation using a plurality of types of BF (see FIGS. 2 and 3). In UL transmission using the single BF operation, orthogonal preambles are applied so as to orthogonalize (avoid contention between) beams (directivities) of UL among a plurality of user terminals (see FIG. 2A). Therefore, as shown in FIG. 3A, it is possible to use the same resource in the frequency domain-time domain.

UL transmission using the multiple BF operation, BF is applied so as to orthogonalize (avoid contention between) beams (directivities) of UL among a plurality of user terminals. For example, in the multiple BF operation, it is considered that different beam patterns in the time domain are applied to transmit a plurality of times, and that an optimal Rx beam is selected (beam scanning) (see FIG. 2B). FIG. 3B shows one example of the multiple BF operation in the radio base station (also called gNB). In this case, the radio base station receives signals from user terminals with different Rx beams in a plurality of unit time segments. FIG. 3C shows one example of the multiple BF operation in the radio base station and the user terminal. Also in this case, the radio base station receives signals from user terminals with different Rx beams in a plurality of unit time segments. On the other hand, the user terminal transmits signals with particular Tx beams (UE beam #1, UE beam #2 in FIG. 3C).

In the case of the multiple BF operation, as compared with the single BF operation, it is possible to decrease the number of orthogonal preambles. Further, in the case of the multiple BF operation, since different beam patterns are applied in the time domain, more PRACH (Physical Random Access Channel) resources are required in the time region.

Figure 4B:
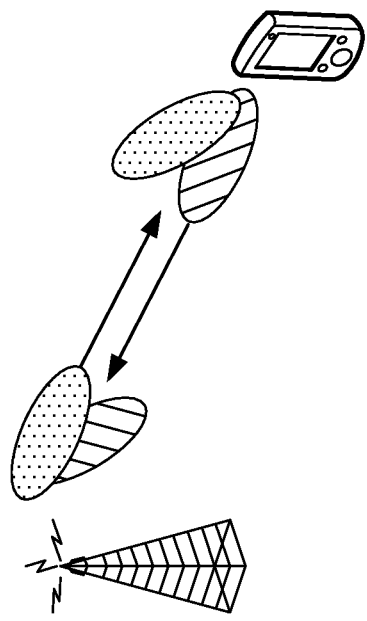
FIG. 4B is a diagram illustrating the case where it is not possible to use Tx/Rx reciprocity.
Figure 4A:
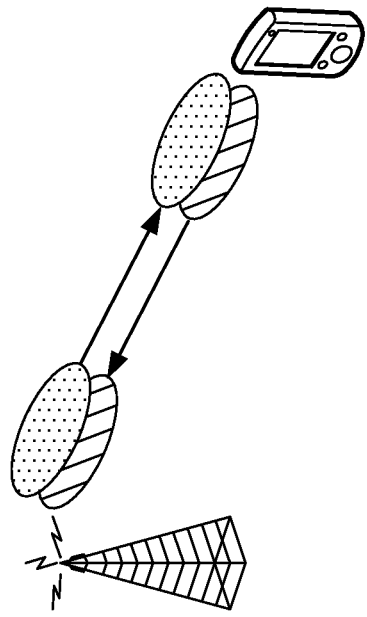
FIG. 4A is a diagram illustrating the case where it is possible to use Tx/Rx reciprocity.

In beam transmission/reception between the radio base station and the user terminal, there are the case where it is possible to use Tx/Rx reciprocity, and the case where it is not possible to use the Tx/Rx reciprocity (see FIG. 4).

In the case where it is possible to use the Tx/Rx reciprocity (see FIG. 4A), beam information detected by a DL signal is used in beam forming for the PRACH, RAR, message 3 and message 4. Thus, when the Tx/Rx reciprocity is used, DL Tx beams and UL Rx beams are linked.

On the other hand, in the case where the Tx/Rx reciprocity is not used (see FIG. 4B), since DL Tx beams and UL Rx beams are not linked, it is necessary to report information on the BS transmission beam and/or the UE reception beam measured in the user terminal to the radio base station. Further, it is necessary for the radio base station to detect information on the UE transmission beam and/or the BS reception beam.

In such technical background, in communication using beam forming, in order to reliably receive a preamble and messages in the random access procedure, and to perform random access with efficiency, the inventors of the present invention proposed that reports of beam information are performed with efficiency, including use/disuse of Tx/Rx reciprocity.

In this proposal, on the premise of multi-BS beam forming, there are the case of single UE beam forming+disuse of Tx/Rx reciprocity, the case of single UE beam forming+use of Tx/Rx reciprocity, the case of multi-UE beam forming+disuse of Tx/Rx reciprocity, and the case of multi-UE beam forming+use of Tx/Rx reciprocity.

Embodiments according to the present invention will be described below in detail with reference to drawings. A radio communication method according to each Embodiment may be applied alone, or may be applied in combination.

In addition, in the present Description, for example, "a plurality of beams (beam patterns) differs" is assumed to represent the case where at least one differs among the following (1) to (6) respectively applied to a plurality of beams, but is not limited thereto. (1) Precoding, (2) transmit power, (3) phase rotation, (4) beam width, (5) angle of a beam (e.g., tilt angle) and (6) the number of layers. In addition, in the case where precoding differs, precoding weights may differ, or schemes (e.g., linear precoding and nonlinear precoding) of precoding may differ. In the case of applying linear/nonlinear precoding to beams, transmit power, phase rotation, the number of layers and the like may also vary.

As an example of linear precoding, there is precoding in conformity with Zero-Forcing (ZF) standards, Regularized Zero-Forcing (R-ZF) standards, Minimum Mean Square Error (MMSE) standards or the like. Further, as an example of nonlinear precoding, there is precoding of Dirty Paper Coding (DPC), Vector Perturbation (VP), Tomlinson Harashima Precoding (THP) and the like. In addition, the applied precoding is not limited thereto.

(Aspect 1)

On the premise of multi-BS beam forming, Aspect 1 describes the case of single UE beam forming+disuse of Tx/Rx reciprocity, and the case of single UE beam forming+ use of Tx/Rx reciprocity.

The case of not using the Tx/Rx reciprocity will be described first.

In the case of not using the Tx/Rx reciprocity, since a DL Tx beam and a UL Rx beam are not linked, it becomes the problem how to notify the radio base station of optimal BS beam information (e.g., beam index, etc.). In this Embodiment, the user terminal associates the BS beam information with another piece of information to notify the radio base station.

In other words, the user terminal transmits, to the radio base station, the PRACH including beam information on the beam of the radio base station detected by a DL signal (DL broadcast channel) transmitted from the radio base station, and thereby notifies the radio base station of optimal BS beam information (e.g., beam index, etc.). Herein, as the information to associate with the BS beam information, there are a PRACH sequence (e.g., the sequence number of ZC (Zadoff-Chu) sequence, the CS (Cyclic Shift) number), time·frequency resources for the PRACH and the like.

Figure 5A:
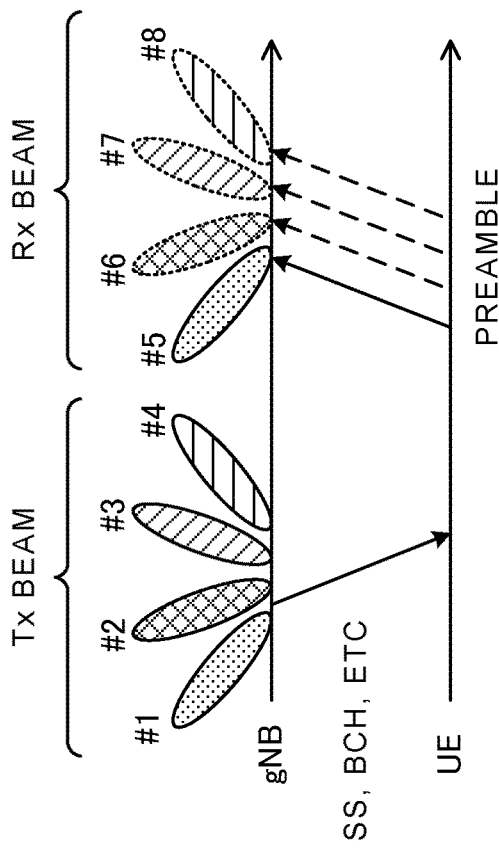
FIG. 5A is a diagram illustrating the case where Tx/Rx reciprocity is not used in Aspect 1.

In the case of not using the Tx/Rx reciprocity, the user terminal transmits a PRACH signal including the BS beam information to the radio base station. For example, as shown in FIG. 5A, the radio base station (gNB) transmits, to the user terminal, a synchronization signal and broadcast channel signal (Broadcast Channel) with Tx beams of beam indexes #1 to #4 by analog BF, respectively. The user terminal detects the best BS Tx beam from the received DL signal. By this means, the beam index of the best BS Tx beam is obtained. Herein, it is assumed that the BS Tx beam of beam index #1 is the best.

Figures 6A, 6B:
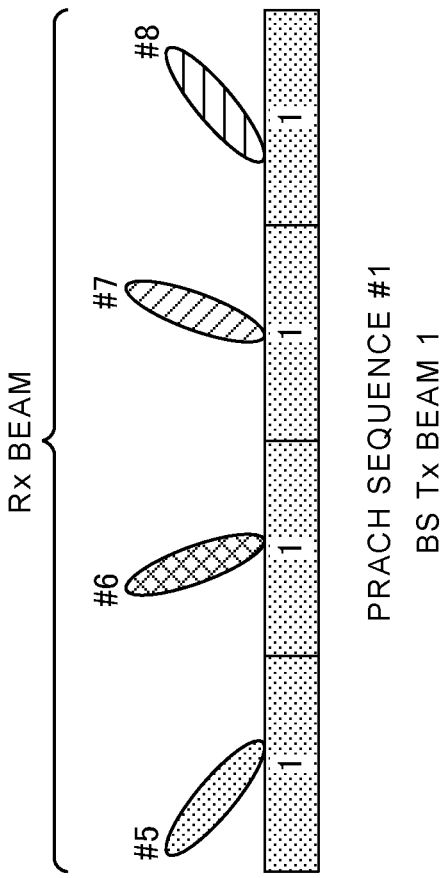
FIG. 6A is a diagram showing a table for associating BS Tx beam index with PRACH sequence.
FIG. 6B is a diagram of the case of transmitting PRACH using the table shown in FIG. 6A.

In this Embodiment, as shown in FIG. 6A, the information (beam index) on the BS Tx beam is associated with the PRACH sequence (predetermined PRACH sequence configured corresponding to the beam information). In FIG. 6A, BS Tx beam index #1 corresponds to PRACH sequence #1, BS Tx beam index #2 corresponds to PRACH sequence #2, BS Tx beam index #3 corresponds to PRACH sequence #3, and BS Tx beam index #4 corresponds to PRACH sequence #4. In addition, the correspondence relationship shown in FIG. 6A is one example, and is not limited thereto.

By referring to the correspondence relationship shown in FIG. 6A, the user terminal selects PRACH sequence #1 that is the PRACH sequence corresponding to beam index #1, and transmits the PRACH (PRACH including the beam information) with the PRACH sequence #1 to the radio base station. Herein, as shown in FIG. 6B, the user terminal transmits the PRACH with the PRACH sequence #1 a plurality of times (4 times in FIG. 6B) in different transmission time intervals (over a plurality of unit time segments (4 unit time segments in FIG. 6B)) (see FIG. 5A).

Thus, by transmitting the PRACH with the PRACH sequence #1 to the radio base station a plurality of times, the radio base station side is capable of measuring the BS Rx beam. In other words, the radio base station detects the PRACH, while performing BS Rx beam scanning, and is thereby capable of measuring the best BS Rx beam. The radio base station recognizes that the PRACH sequence is the PRACH sequence #1 by detecting the PRACH, and is thereby capable of realizing that the best BS Tx beam is the beam subjected to beam forming with the beam index #1. The radio base station and user terminal perform transmission and reception using the optimal beam in the random access procedure of RAR transmission and subsequent thereto.

In addition, the information (e.g., the table for associating the BS Tx beam index with the PRACH sequence shown in FIG. 6A) on the correspondence relationship between the beam information and the sequence of the PRACH and/or information on the number of transmission times of the PRACH may be beforehand determined by specifications, or may be notified from the radio base station to the user terminal by broadcast information, higher layer signaling, downlink control signal and the like. Further, in the above-mentioned explanation, the case is described where the optimal BS beam information is notified on the PRACH that is the initial stage of the random access procedure, and in this Embodiment, the optimal BS beam information may be notified by message 3.

Further, as shown in FIG. 7, the correspondence relationship between the beam information and the sequence of the PRACH may be defined in a form of shifting the PRACH sequence for each subframe. In other words, as described above, instead of associating the PRACH transmitted a plurality of times with the same PRACH sequence, a pattern of different PRACH sequences may be assigned to the PRACH transmitted a plurality of times. By this means, it is expected that detection accuracy of the PRACH is improved.

The case of using the Tx/Rx reciprocity will be described next.

Figure 5B:
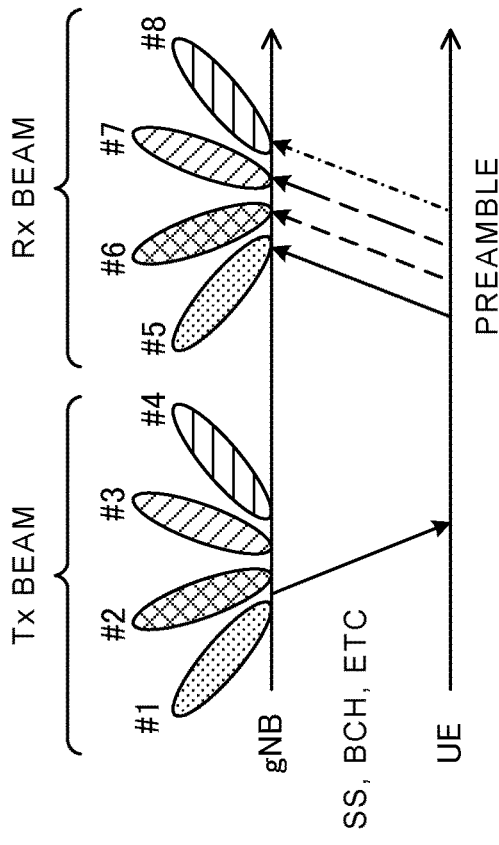
FIG. 5B is a diagram illustrating the case where Tx/Rx reciprocity is used in Aspect 1.

In the case of using the Tx/Rx reciprocity, a DL Tx beam and a UL Rx beam are linked. For example, as shown in FIG. 5B, the radio base station transmits, to the user terminal, a synchronization signal and broadcast channel signal with Tx beams of beam indexes #1 to #4 by analog BF, respectively. The user terminal detects the best BS Tx beam from the received DL signal. By this means, the beam index of the best BS Tx beam is obtained. Herein, it is assumed that the BS Tx beam of beam index #1 is the best.

The user terminal transmits the PRACH, using PRACH resources that correspond to beam index #1 of the obtained BS Tx/Rx beam. In the case where it is possible to use the Tx/Rx reciprocity, the radio base station detects the PRACH using the suitable reception beam (beam index #1), and is capable of obtaining the corresponding BS Tx/Rx beam index #1. The radio base station and user terminal perform transmission and reception using the optimal beam in the random access procedure of RAR transmission and subsequent thereto.

In addition, information on which PRACH resource is associated with which beam index of BS Tx/Rx beam may be beforehand determined by specifications, or may be notified from the radio base station to the user terminal by broadcast information, higher layer signaling, downlink control signal and the like.

In this way, when it is possible to use the Tx/Rx reciprocity, it is not necessary to transmit the PRACH a plurality of time as shown in FIG. 5B. Also in this case, as shown in FIG. 6A, the information (beam index) on the BS Tx beam may be associated with the PRACH sequence. The association of the information (beam index) on the BS Tx beam with the PRACH sequence is applicable also to the hybrid configuration with analog BF and digital BF.

Figure 8A:
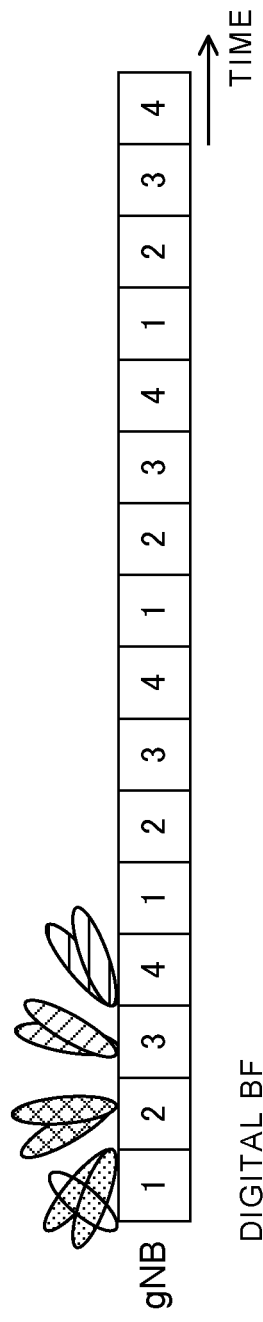
FIGS. 8A and 8B are diagrams illustrating PRACH transmission in hybrid BF.
Figure 8B:
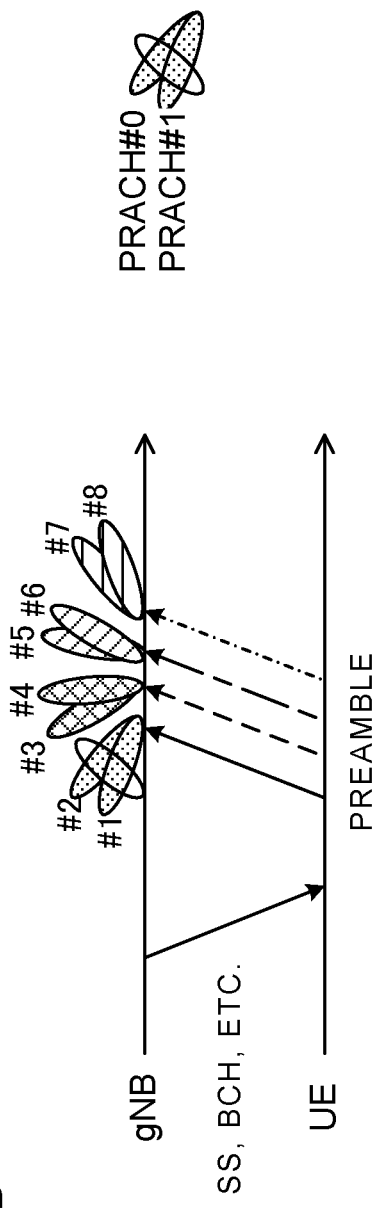

FIGS. 8A and 8B are diagrams illustrating PRACH transmission in hybrid BF. FIG. 8 illustrates the case of using the Tx/Rx reciprocity. Herein, as shown in FIG. 8A, the radio base station transmits DL signals with two beams (digital BF) with respect to one antenna port. Specifically, as shown in FIG. 8B, the radio base station (gNB) transmits, to the user terminal, a synchronization signal and broadcast channel signal (Broadcast Channel) with two beams over 4 unit time segments (e.g., subframes), respectively.

The user terminal detects the best BS Tx beam from the received DL signal. In other words, an analog/digital beam index of the best BS Tx beam is obtained from the BS Tx beams of total 8 analog/digital beam indexes #1 to #8 of 4 subframes×2 beams. Herein, it is assumed that the BS Tx beam of analog/digital beam index #1 is the best.

The user terminal transmits the PRACH, using the PRACH sequence and PRACH resources (herein, PRACH sequence #1) that correspond to analog/digital beam index #1 of the obtained BS Tx/Rx beam. By detecting the PRACH, the radio base station is capable of obtaining corresponding BS Tx/Rx analog/digital beam index #1. The radio base station and user terminal perform transmission and reception using the optimal beam in the random access procedure of RAR transmission and subsequent thereto.

In addition, information on which PRACH sequence and PRACH resource are associated with which analog beam index of BS transmission/reception beam may be notified from the radio base station to the user terminal by RRC signaling, downlink control signal and the like.

(Aspect 2)

On the premise of multi-BS beam forming, Aspect 2 describes the case of multi-UE beam forming+disuse of Tx/Rx reciprocity, and the case of multi-UE beam forming+ use of Tx/Rx reciprocity.

The case of not using the Tx/Rx reciprocity will be described first.

In the case of not using the Tx/Rx reciprocity, since DL Tx beams and UL Rx beams are not linked, it becomes the problem how to notify the radio base station of optimal BS Tx beam information (e.g., beam index, etc.) and optimal UE Rx beam information (e.g., beam index, etc.). In this Embodiment, the user terminal associates the BS Tx beam information and UE Rx beam information with another piece of information to notify the radio base station of the BS Tx beam information and UE Rx beam information.

In other words, the user terminal transmits, to the radio base station, the PRACH including beam information on the BS Tx beam of the radio base station and UE Rx beam of the user terminal, detected by a DL signal (DL broadcast channel) transmitted from the radio base station, and thereby notifies the radio base station of optimal BS Tx beam information and UE Rx beam information (e.g., beam index, etc.). Herein, as the information to associate with the BS Tx beam information and UE Rx beam information, there are a PRACH sequence (e.g., the sequence number of ZC (Zad- off-Chu) sequence, the CS (Cyclic Shift) number), time-frequency resources for the PRACH and the like.

In the case of not using the Tx/Rx reciprocity, the user terminal transmits a PRACH signal including the BS Tx beam information and UE Rx beam information to the radio base station. For example, the radio base station (gNB) transmits, to the user terminal, a synchronization signal and broadcast channel signal (Broadcast Channel) with Tx beams of beam indexes #1 to #3 by analog BF, respectively. The user terminal detects the best BS Tx beam from the received DL signal. By this means, the beam index of the best BS Tx beam is obtained. Herein, it is assumed that the BS Tx beam of beam index #1 is the best.

Figure 9A:
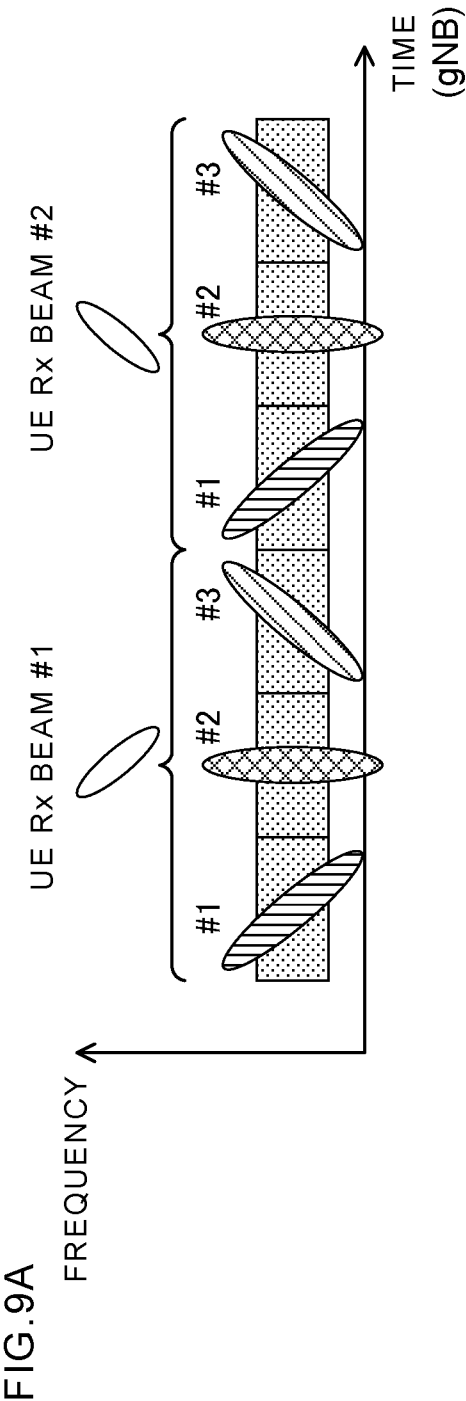
FIGS. 9A and 9B are diagrams illustrating the case where Tx/Rx reciprocity is not used in Aspect 2.

On the other hand, for example, when the radio base station transmits, to the user terminal, the synchronization signal and broadcast channel signal with Tx beams of beam indexes #1 to #3 by analog BF, respectively, as shown in FIG. 9A, the user terminal detects the best UE Rx beam from the received DL signal. By this means, the beam index of the best UE Rx beam is obtained. Herein, it is assumed that the UE Rx beam of beam index #2 is the best.

In this Embodiment, as shown in FIG. 10, the information on the BS Tx beam and UE Rx beam information (beam index) is associated with the PRACH sequence (predetermined PRACH sequence configured corresponding to the beam information). In FIG. 10, BS Tx beam index #1/UE Rx beam index #1 correspond to PRACH sequence #1, BS Tx beam index #2/UE Rx beam index #1 correspond to PRACH sequence #2, BS Tx beam index #3/UE Rx beam index #1 correspond to PRACH sequence #3, BS Tx beam index #1/UE Rx beam index #2 correspond to PRACH sequence #4, BS Tx beam index #2/UE Rx beam index #2 correspond to PRACH sequence #5, and BS Tx beam index #3/UE Rx beam index #2 correspond to PRACH sequence #6. In addition, the correspondence relationship shown in FIG. 10 is one example, and is not limited thereto.

Figure 9B:
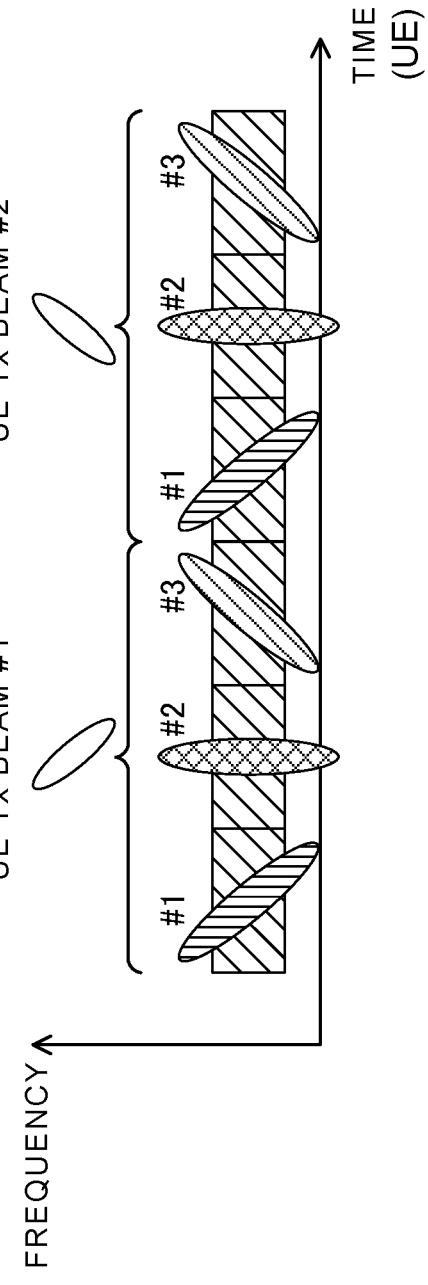

By referring to the correspondence relationship shown in FIG. 10, the user terminal selects PRACH sequence #4 that is the PRACH sequence corresponding to BS Tx beam index #1/UE Rx beam index #2, and transmits the PRACH (PRACH including the beam information) with the PRACH sequence #4 to the radio base station with the beam of UE Tx beam index #1. For example, as shown in FIG. 9B, the user terminal transmits the PRACH with the PRACH sequence #4 a plurality of times (3 times in FIG. 9B) in different transmission time intervals (over a plurality of unit time segments (3 unit time segments in FIG. 9B)). Further, similarly, the user terminal transmits the PRACH (PRACH including the beam information) with the PRACH sequence #4 to the radio base station with the beam of UE Tx beam index #2.

Thus, by transmitting the PRACH with the PRACH sequence #4 to the radio base station a plurality of times, the radio base station side is capable of measuring the BS Rx beam and UE Tx beam. In other words, the radio base station detects the PRACH, while performing BS Rx beam scanning, and is thereby capable of measuring the best BS Rx beam and UE Tx beam. The radio base station recognizes that the PRACH sequence is the PRACH sequence #4 by detecting the PRACH, and is thereby capable of realizing that the best BS Tx beam is the beam subjected to beam forming with the beam index #1, and that the best UE Rx beam is the beam subjected to beam forming with the beam index #2. The radio base station and user terminal perform transmission and reception using the optimal beam in the random access procedure of RAR transmission and subsequent thereto.

Further, in order for the user terminal to use the optimal UE Tx beam in the random access procedure of RAR transmission and subsequent thereto, the radio base station notifies the user terminal of the detected UE Tx beam. For example, the radio base station may notify the user terminal of information on the predetermined UE Tx beam, using a downlink control signal (e.g., UL grant of RAR) immediately after PRACH reception.

In addition, the information (e.g., the table for associating the BS Tx beam index and UE Rx beam index with the PRACH sequence shown in FIG. 10) on the correspondence relationship between the beam information and the sequence of the PRACH and/or information on the number of transmission times of the PRACH may be beforehand determined by specifications, or may be notified from the radio base station to the user terminal by higher layer signaling, downlink control signal and the like. Further, in the above-mentioned explanation, the case is described where the optimal beam information is notified on the PRACH that is the initial stage of the random access procedure, and in this Embodiment, the optimal beam information may be notified by message 3.

Further, also in this Embodiment, the correspondence relationship between the beam information and the sequence of the PRACH may be defined in a form of shifting the PRACH sequence for each subframe. In other words, as described above (see FIG. 7), instead of associating the PRACH transmitted a plurality of times with the same PRACH sequence, a pattern of different PRACH sequences may be assigned to the PRACH transmitted a plurality of times. By this means, it is expected that detection accuracy of the PRACH is improved.

The case of using the Tx/Rx reciprocity will be described next.

In the case of using the Tx/Rx reciprocity, DL Tx beams and UL Rx beams are linked. For example, the radio base station transmits, to the user terminal, a synchronization signal and broadcast channel signal with Tx beams of beam indexes #1 to #3 by analog BF, respectively. The user terminal detects the best BS Tx beam from the received DL signal. By this means, the beam index of the best BS Tx beam is obtained. Herein, it is assumed that the BS Tx beam of beam index #1 is the best.

On the other hand, for example, when the radio base station transmits, to the user terminal, the synchronization signal and broadcast channel signal with Tx beams of beam indexes #1 to #3 by analog BF, respectively, as shown in FIG. 11A, the user terminal detects the best UE Rx beam from the received DL signal. By this means, the beam index of the best UE Rx beam is obtained. Herein, it is assumed that the UE Rx beam of beam index #2 is the best.

As shown in FIG. 11B, the user terminal transmits the PRACH, using the PRACH sequence that corresponds to beam index #2 of the obtained UE Rx beam. The radio base station detects the PRACH, and is thereby capable of obtaining the corresponding UE Rx beam index #2. The radio base station and user terminal perform transmission and reception using the optimal beam in the random access procedure of RAR transmission and subsequent thereto.

In addition, information on which PRACH resource is associated with which beam index may be beforehand determined by specifications, or may be notified from the radio base station to the user terminal by broadcast information, higher layer signaling, downlink control signal and the like.

In this way, when it is possible to use the Tx/Rx reciprocity, it is not necessary to transmit the PRACH a plurality of time as shown in FIG. 11B. Also in this case, as shown in FIG. 10, the information (beam index) on the UE Rx beam may be associated with the PRACH sequence. The association of the information (beam index) on the UE Rx beam with the PRACH sequence is usable also in the hybrid configuration with analog BF and digital BF.

In Aspect 2, the presence or absence of use of the Tx/Rx reciprocity may be associated with the PRACH sequence to notify the radio base station of whether the user terminal is capable of using the Tx/Rx reciprocity. Further, the radio base station is not capable of determining whether the user terminal is a user terminal capable of using the Tx/Rx reciprocity. Therefore, a mode with repeated transmission with respect to the PRACH, and another mode without repeated transmission with respect to the PRACH may be beforehand provided, so that the user terminal is capable of selecting the mode corresponding to the terminal capability. By this means, the radio base station is capable of controlling transmission/reception corresponding to the capability of the user terminal.

In Aspects 1 and 2, the notification of use of the Tx/Rx reciprocity is capable of being replaced with notification of the information on the correspondence relationship between the beam information (e.g., beam index) and the sequence of PRACH and/or notification of the information on the number of transmission times of PRACH. Further, the information on the correspondence relationship between the beam information (e.g., beam index) and the sequence of PRACH may beforehand be broadcast to the user terminal on the broadcast channel, or may be configured individually for each user terminal after RRC connection.

(Radio Communication System)

A configuration of a radio communication system according to one Embodiment of the present invention will be described below. In the radio communication system, communication is performed by using any of the radio communication methods according to above-mentioned each Embodiment of the invention or combination thereof.

Figure 12:
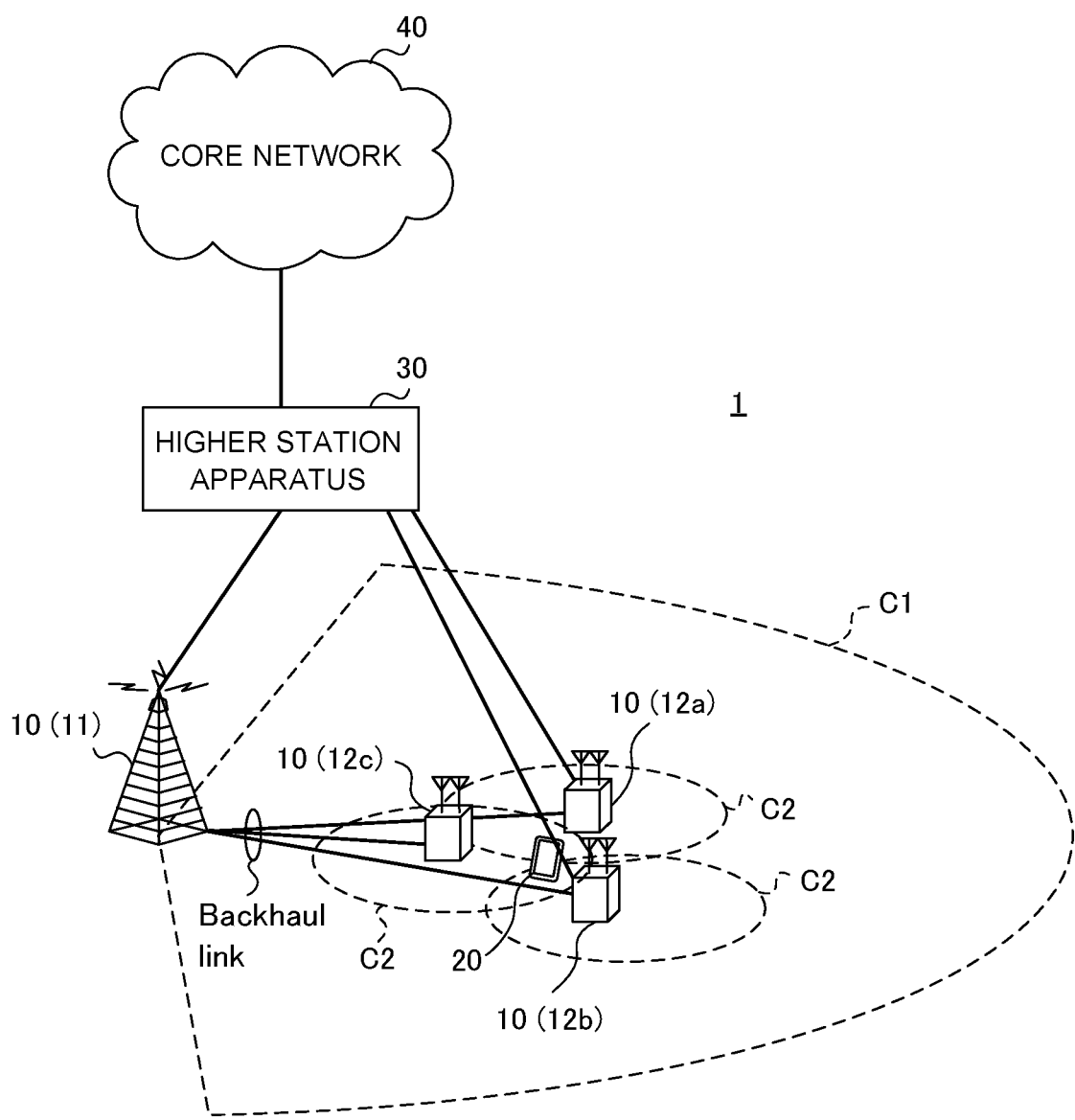
FIG. 12 is a diagram showing one example of a schematic configuration of a radio communication system according to one Embodiment of the present invention.

FIG. 12 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC).

In addition, the radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology) and the like, or may be called the system to actualize each system described above.

In the radio communication system 1, a radio base station using a plurality of types of beam forming communicates with a user terminal, the user terminal transmits a random access preamble (PRACH) including beam information on the beam of the radio base station, and the radio base station receives the PRACH including the beam information.

The radio communication system 1 is provided with a radio base station 11 for forming a macrocell C1 with relatively wide coverage, and radio base stations 12 (12a to 12c) disposed inside the macrocell C1 to form small cells C2 narrower than the macrocell C1. Further, a user terminal 20 is disposed in the macrocell C1 and each of the small cells C2.

The user terminal 20 is capable of connecting to both the radio base station 11 and the radio base station 12. The user terminal 20 is assumed to concurrently use the macrocell C1 and small cell C2 using CA or DC. Further, the user terminal 20 may apply CA or DC using a plurality of cells (CCs) (e.g., 5 CCs or less, 6 CCs or more).

The user terminal 20 and radio base station 11 are capable of communicating with each other using carriers (called the existing carrier, Legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, etc.), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface, etc.), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal (fixed station), as well as the mobile communication terminal (mobile station).

In the radio communication system 1, as radio access schemes, Orthogonal Frequency Division Multiple Access (OFDMA) is applied on downlink, and Single Carrier Frequency Division Multiple Access (SC-FDMA) is applied on uplink.

OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and another radio access scheme may be used.

As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH.

The downlink L1/L2 control channel includes PDCCH (Physical Downlink Control Channel), EPDCCH (Enhanced Physical Downlink Control Channel), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. Receipt confirmation information (e.g., also referred to as retransmission control information, HARQ-ACK, ACK/NACK, etc.) of HARQ (Hybrid Automatic Repeat reQuest) for the PUSCH is transmitted on the PHICH. The EPDCCH is frequency division multiplexed with the PDSCH (downlink shared data channel) to be used in transmitting the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data and higher layer control information is transmitted on the PUSCH. Further, radio quality information (CQI: Channel Quality Indicator) of downlink, receipt confirmation information and the like are transmitted on the PUCCH. A random access preamble to establish connection with the cell is transmitted on the PRACH.

As downlink reference signals, in the radio communication system 1 are transmitted Cell-specific Reference Signal (CRS), Channel State Information-Reference Signal (CSI-RS), Demodulation Reference Signal (DMRS: DeModulation Reference Signal), Positioning Reference Signal (PRS) and the like. Further, as uplink reference signals, in the radio communication system 1 are transmitted Sounding Reference Signal (SRS), Demodulation Reference Signal (DMRS) and the like. In addition, the DMRS may be called UE-specific Reference Signal. Further, the transmitted reference signals are not limited thereto.

(Radio Base Station)

The radio base station uses a plurality of types of beam forming, transmits a DL signal to the user terminal, and receives a random access preamble (PRACH) including the beam information on the beam of the radio base station detected by the DL signal.

Figure 13:
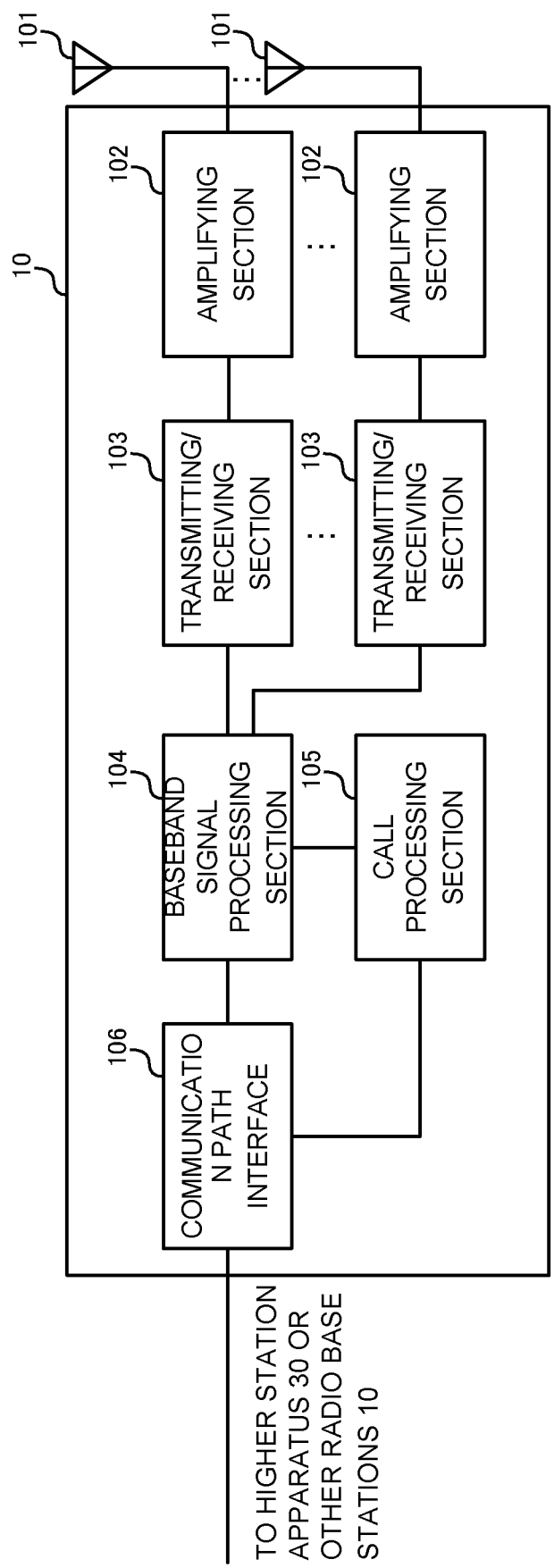
FIG. 13 is a diagram showing one example of an entire configuration of a radio base station according to one Embodiment of the invention.

FIG. 13 is a diagram showing one example of an entire configuration of the radio base station according to one Embodiment of the present invention. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ), scheduling, transmission format selection, channel coding, Inverse Fast Fourier Transform (IFFT) processing, and precoding processing to transfer to the transmitting/receiving sections 103. Further, also concerning a downlink control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101. The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for uplink signals, radio-frequency signals received in the transmitting/receiving antennas 101 are amplified in the amplifying sections 102. The transmitting/receiving section 103 receives the uplink signal amplified in the amplifying section 102. The transmitting/receiving section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT: INveRSe Discrete Fourier Transform) processing, error correcting decoding, reception processing of MAC retransmission control, and reception processing of RLC layer and PDCP layer to transfer to the higher station apparatus 30 via the communication path interface 106. The call processing section 105 performs call processing such as configuration and release of a communication channel, state management of the radio base station 10, and management of radio resources.

The communication path interface 106 transmits and receives signals to/from the higher station apparatus 30 via a predetermined interface. Further, the communication path interface 106 may transmit and receive signals (backhaul signaling) to/from another radio base station 10 via an inter-base station interface (e.g., optical fiber in conformity with CPRI (Common Public Radio Interface), X2 interface).

In addition, the transmitting/receiving section 103 may further have an analog beam forming section for performing analog beam forming. The analog beam forming section is capable of being comprised of an analog beam forming circuit (e.g., phase shifter, phase shift circuit) or analog beam forming apparatus (e.g., phase shift device) explained based on the common recognition in the technical field according to the present invention. Further, for example, the transmitting/receiving antenna 101 is capable of being comprised of an array antenna. Furthermore, the transmitting/receiving section 103 is configured to be able to apply single BF and multi-BF.

The transmitting/receiving section 103 may transmit the synchronization signal, broadcast channel signal, and reference signal for beam pattern measurement, for beam measurement in the user terminal. Further, the transmitting/receiving section 103 receives the random access preamble (PRACH) including the beam information on the beam of the DL signal. Furthermore, the transmitting/receiving section 103 receives the PRACH transmitted from the user terminal using optimal beam information (e.g., beam index).

Figure 14:
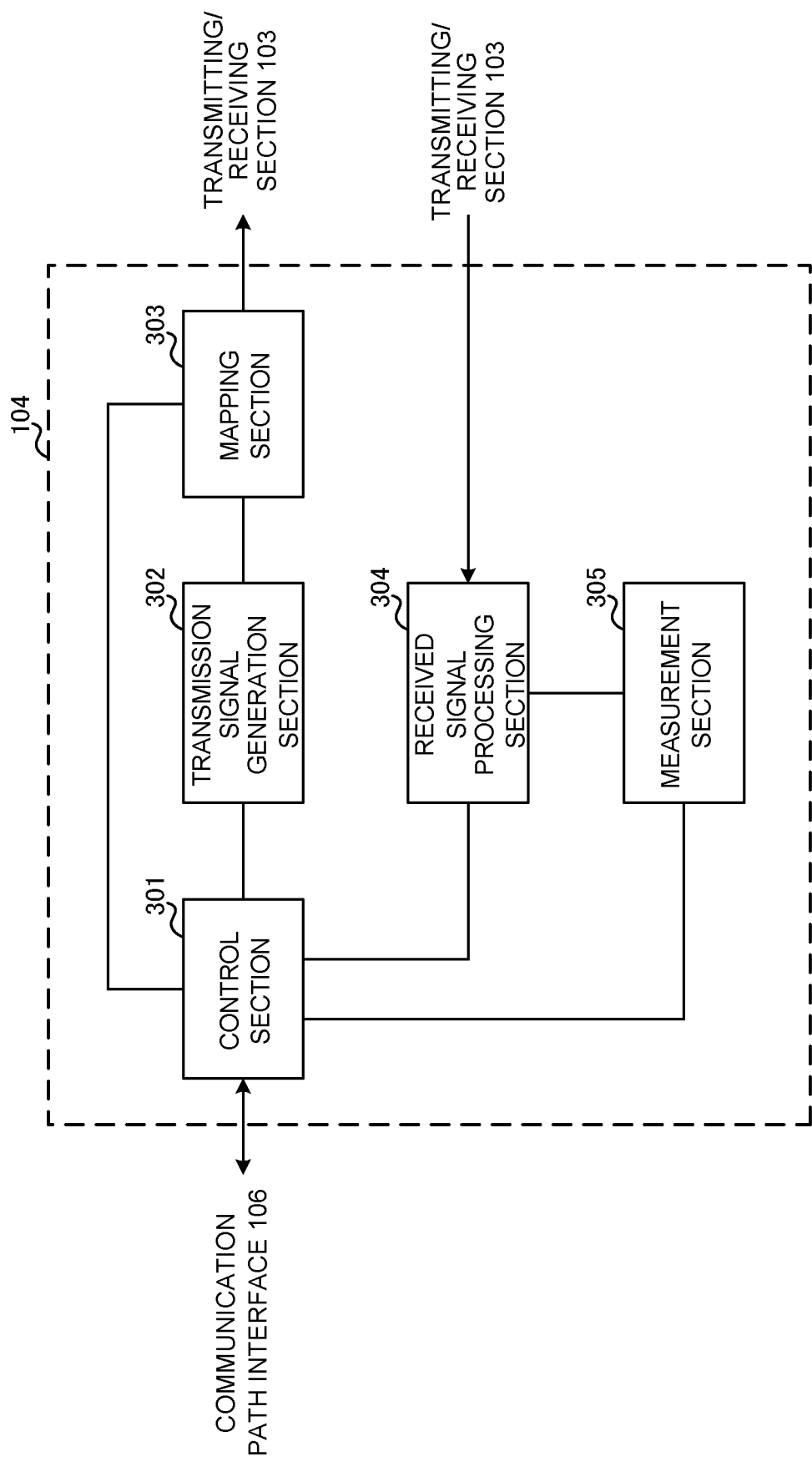
FIG. 14 is a diagram showing one example of a function configuration of the radio base station according to one Embodiment of the invention.

FIG. 14 is a diagram showing one example of a function configuration of the radio base station according to one Embodiment of the present invention. In addition, this example mainly illustrates function blocks of a characteristic portion in this Embodiment, and the radio base station 10 is assumed to have other function blocks required for radio communication.

The baseband signal processing section 104 is provided with at least a control section (scheduler) 301, transmission signal generating section 302, mapping section 303, received signal processing section 304, and measurement section 305. In addition, these components are essentially included in the radio base station 10, and a part or the whole of the components may not be included in the baseband signal processing section 104.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals by the transmission signal generating section 302, and allocation of signals by the mapping section 303. Further, the control section 301 controls reception processing of signals by the received signal processing section 304, and measurement of signals by the measurement section 305.

The control section 301 controls scheduling (e.g., resource allocation) of system information, downlink data signal transmitted on the PDSCH, and downlink control signal transmitted on the PDCCH and/or EPDCCH. Further, based on a result obtained by determining necessity of retransmission control to an uplink data signal and the like, the control section 301 controls generation of the downlink control signal (e.g., receipt confirmation information, etc.) and downlink data signal. Furthermore, the control section 301 controls scheduling of the synchronization signal (e.g., PSS (Primary Synchronization Signal/SSS (Secondary Synchronization Signal)), and downlink reference signals such as CRS, CSI-RS and DMRS.

Moreover, the control section 301 controls scheduling of the uplink data signal transmitted on the PUSCH, uplink control signal (e.g., receipt confirmation information) transmitted on the PUCCH and/or PUSCH, RACH preamble transmitted on the PRACH, uplink reference signal and the like.

The control section 301 controls to form a Tx beam and/or an Rx beam, using digital BF (e.g., precoding) by the baseband signal processing section 104 and/or analog BF (e.g., phase rotation) by the transmitting/receiving section 103.

In the case where single UE beam forming is used and the Tx/Rx reciprocity is not used, the control section 301 recognizes a PRACH sequence of the PRACH received a plurality of times, and identifies the beam information (e.g., beam index) that corresponds to the PRACH sequence. At this point, for example, by referring to the table shown in FIG. 6A, the control section 301 identifies the beam information from the PRACH sequence. In addition, at this point, the transmitting/receiving section 103 detects the PRACH transmitted from the user terminal a plurality of times, while performing BS Rx beam scanning. By this means, it is possible to measure the best BS Rx beam.

Further, in the case where multi-UE beam forming is used and the Tx/Rx reciprocity is not used, the control section 301 recognizes a PRACH sequence of the PRACH received a plurality of times, and identifies the beam information (e.g., beam index) that corresponds to the PRACH sequence. At this point, for example, by referring to the table shown in FIG. 10, the control section 301 identifies the beam information from the PRACH sequence. In addition, at this point, the transmitting/receiving section 103 detects the PRACH transmitted from the user terminal a plurality of times, while performing BS Rx beam scanning. By this means, it is possible to recognize the best BS Tx beam and best UE Rx beam.

Based on instructions from the control section 301, the transmission signal generating section 302 generates downlink signals (downlink control signal, downlink data signal, downlink reference signal, etc.) to output to the mapping section 303. The transmission signal generating section 302 is capable of being comprised of a signal generator, signal generating circuit or signal generating apparatus explained based on the common recognition in the technical field according to the present invention.

For example, based on instructions from the control section 301, the transmission signal generating section 302 generates DL assignment to notify of assignment information of downlink signals and UL grant to notify of assignment information of uplink signals. Further, the downlink data signal is subjected to coding processing and modulation processing, according to a coding rate, modulation scheme and the like determined based on the channel state information (CSI) from each user terminal 20 and the like.

Based on instructions from the control section 301, the mapping section 303 maps the downlink signal generated in the transmission signal generating section 302 to predetermined radio resources to output to the transmitting/receiving section 103. The mapping section 303 is capable of being comprised of a mapper, mapping circuit or mapping apparatus explained based on the common recognition in the technical field according to the present invention.

The received signal processing section 304 performs reception processing (e.g., demapping, demodulation, decoding, etc.) on the received signal input from the transmitting/receiving section 103. Herein, for example, the received signal is the uplink signal (uplink control signal, uplink data signal, uplink reference signal, etc.) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, in the case of receiving the PUCCH including HARQ-ACK, the section 304 outputs the HARQ-ACK to the control section 301. Further, the received signal processing section 304 outputs the received signal and signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, the measurement section 305 may measure received power (e.g., RSRP (Reference Signal Received Power)), received quality (e.g. RSRQ (Reference Signal Received Quality), SINR (Signal to Interference plus Noise Ratio)), channel state and the like of the received signal. The measurement result may be output to the control section 301.

(User Terminal)

The user terminal communicates with the radio base station using a plurality of types of beam forming, receives a DL signal transmitted from the radio base station, and controls to transmit the PRACH including the beam information on the beam of the radio base station. The user terminal controls to transmit the PRACH including the beam information a plurality of times in different transmission time intervals. Further, the user terminal applies the predetermined PRACH sequence configured corresponding to the beam information to a plurality of PRACH transmissions. The user terminal receives the information on the correspondence relationship between the beam information and the sequence of the PRACH and/or information on the number of transmission times of the PRACH.

Figure 15:
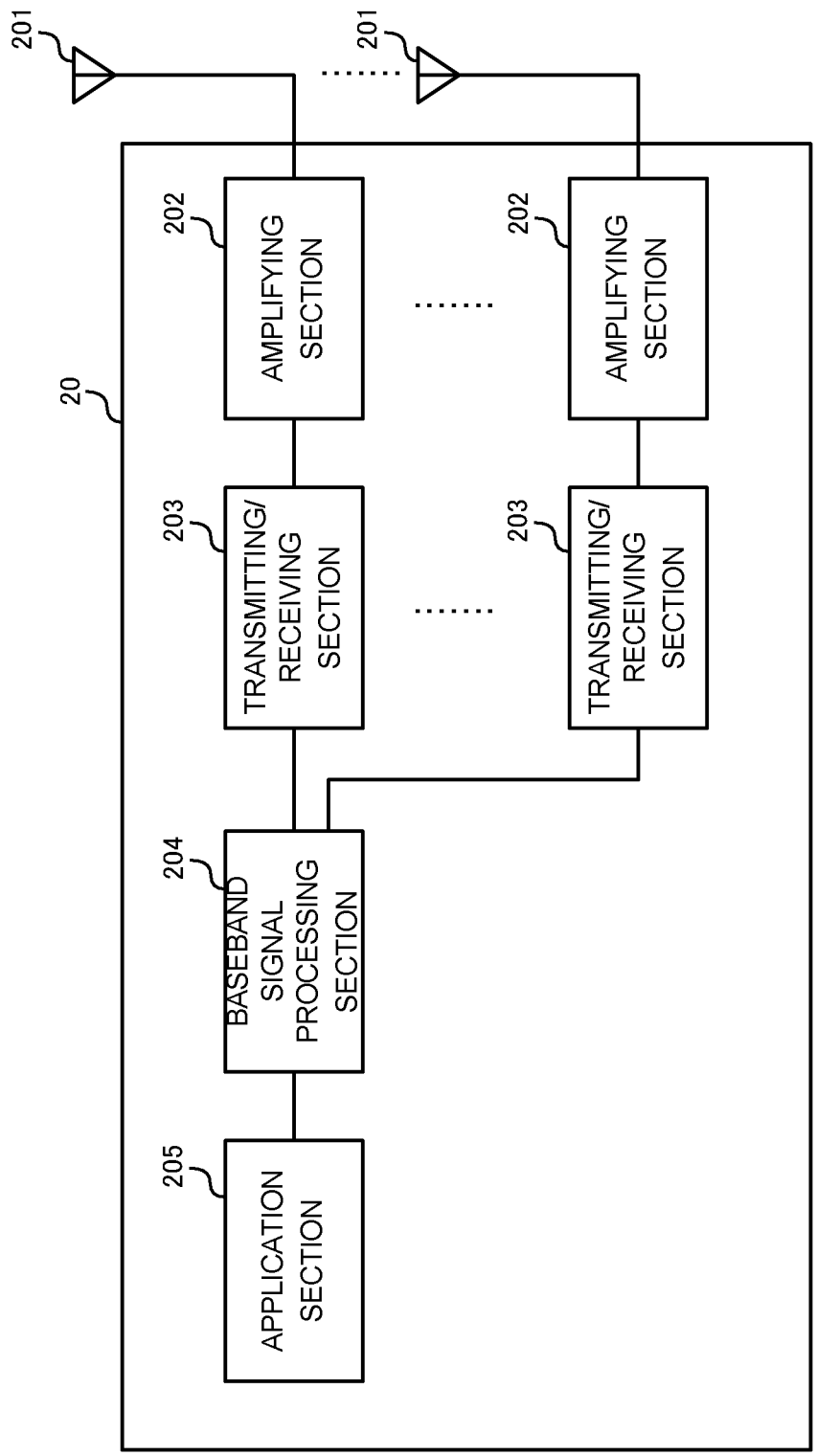
FIG. 15 is a diagram showing one example of an entire configuration of a user terminal according to one Embodiment of the invention.

FIG. 15 is a diagram showing one example of an entire configuration of the user terminal according to one Embodiment of the present invention. The user terminal 20 is provided with a plurality of transmitting/receiving antennas 201, amplifying sections 202, transmitting/receiving sections 203, baseband signal processing section 204, and application section 205. In addition, with respect to each of the transmitting/receiving antenna 201, amplifying section 202, and transmitting/receiving section 203, the user terminal may be configured to include at least one or more.

Radio-frequency signals received in the transmitting/receiving antennas 201 are respectively amplified in the amplifying sections 202. Each of the transmitting/receiving sections 203 receives the downlink signal amplified in the amplifying section 202. The transmitting/receiving section 203 performs frequency conversion on the received signal into a baseband signal to output to the baseband signal processing section 204. The transmitting/receiving section 203 is capable of being comprised of a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information is also transferred to the application section 205.

On the other hand, for user data on uplink, the data is input to the baseband signal processing section 204 from the application section 205. The baseband signal processing section 204 performs transmission processing of retransmission control (e.g., transmission processing of HARQ), channel coding, precoding, Discrete Fourier Transform (DFT) processing, IFFT processing and the like to transfer to each of the transmitting/receiving sections 203. Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

In addition, the transmitting/receiving section 203 may further have an analog beam forming section for performing analog beam forming. The analog beam forming section is capable of being comprised of an analog beam forming circuit (e.g., phase shifter, phase shift circuit) or analog beam forming apparatus (e.g., phase shift device) explained based on the common recognition in the technical field according to the present invention. Further, for example, the transmitting/receiving antenna 201 is capable of being comprised of an array antenna. Furthermore, the transmitting/receiving section 203 is configured to be able to apply single BF and multi-BF.

The transmitting/receiving section 203 may receive the synchronization signal, broadcast channel signal, and reference signal for beam pattern measurement, for beam measurement. Further, the transmitting/receiving section 203 transmits the random access preamble (PRACH) including the beam information on the beam detected from the DL signal. At this point, the transmitting/receiving section 203 transmits the PRACH using the optimal beam information (e.g., beam index).

Figure 16:
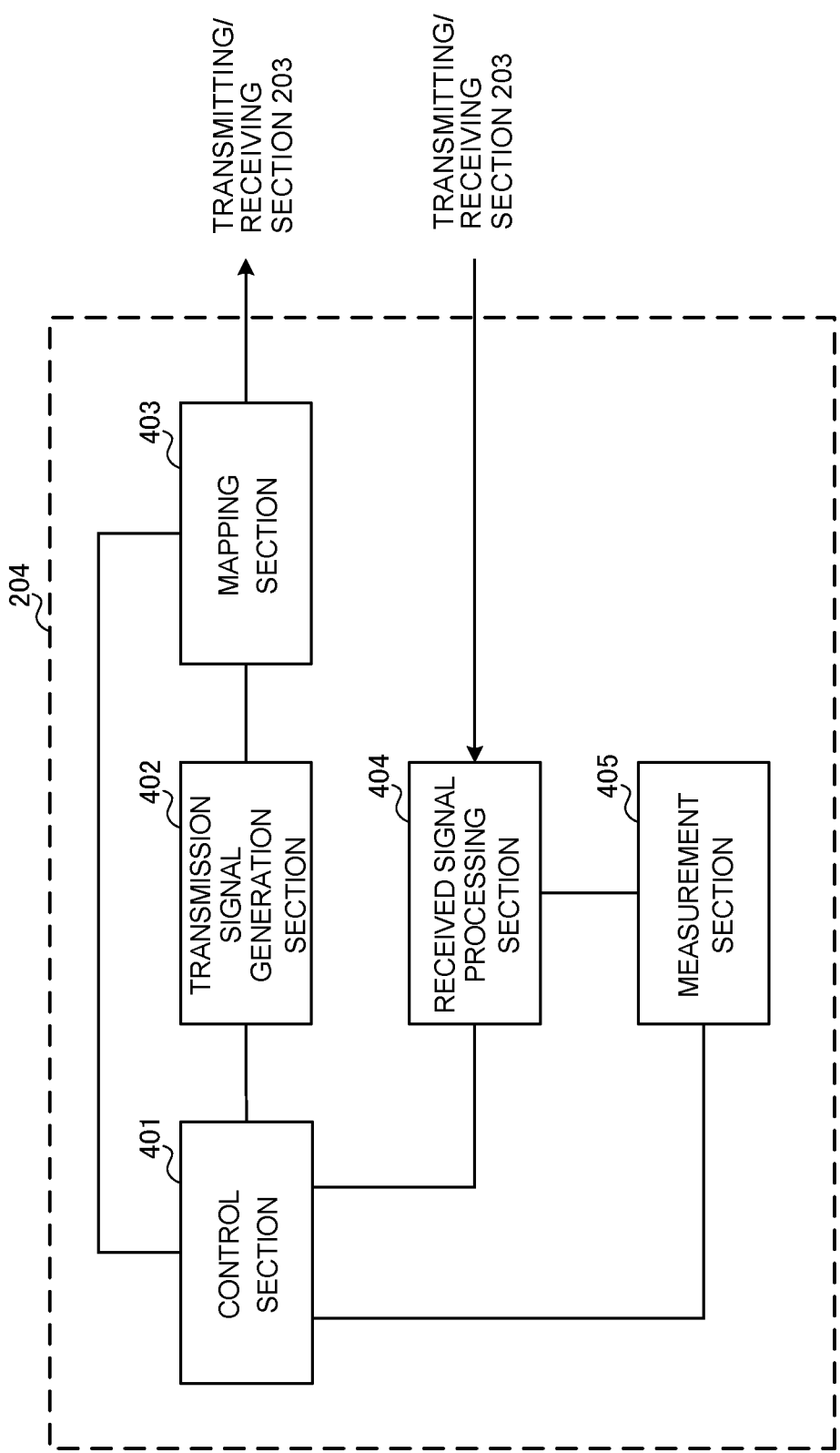
FIG. 16 is a diagram showing one example of a function configuration of the user terminal according to one Embodiment of the invention.

FIG. 16 is a diagram showing one example of a function configuration of the user terminal according to one Embodiment of the present invention. In addition, this example mainly illustrates function blocks of a characteristic portion in this Embodiment, and the user terminal 20 is assumed to have other function blocks required for radio communication.

The baseband signal processing section 204 that the user terminal 20 has is provided with at least a control section 401, transmission signal generating section 402, mapping section 403, received signal processing section 404, and measurement section 405. In addition, these components are essentially included in the user terminal 20, and a part or the whole of the components may not be included in the baseband signal processing section 204.

The control section 401 performs control of the entire user terminal 20. The control section 401 is capable of being comprised of a controller, control circuit or control apparatus explained based on the common recognition in the technical field according to the present invention.

For example, the control section 401 controls generation of signals by the transmission signal generating section 402, and allocation of signals by the mapping section 403. Further, the control section 401 controls reception processing of signals by the received signal processing section 404, and measurement of signals by the measurement section 405.

The control section 401 acquires the downlink control signal (signal transmitted on the PDCCH/EPDCCH) and downlink data signal (signal transmitted on the PDSCH) transmitted from the radio base station 10, from the received signal processing section 404. Based on the downlink control signal, result obtained by determining the necessity of retransmission control to the downlink data signal, and the like, the control section 401 controls generation of the uplink control signal (e.g., receipt confirmation information, etc.) and uplink data signal.

The control section 401 controls to form a transmission beam and/or a reception beam, using digital BF (e.g., precoding) by the baseband signal processing section 204 and/or analog BF (e.g., phase rotation) by the transmitting/receiving section 203.

In the case where single UE beam forming is used and the Tx/Rx reciprocity is not used, the control section 401 controls to transmit, to the radio base station, the PRACH including the beam information (e.g., beam index, etc.) on the beam of the radio base station, detected by the DL signal (DL broadcast channel) transmitted from the radio base station. Further, the control section 401 detects the best BS Tx beam from the received DL signal, and controls to obtain a beam index of the best BS Tx beam. Furthermore, the control section 401 controls to transmit the PRACH with the PRACH sequence that corresponds to the beam index of the best BS Tx beam a plurality of times over a plurality of unit time segments.

At this point, for example, by referring to the table shown in FIG. 6A, the control section 401 identifies the PRACH sequence from the beam index.

In the case where multi-UE beam forming is applied and the Tx/Rx reciprocity is not used, the control section 401 controls to transmit, to the radio base station, the PRACH including the beam information (e.g., beam index, etc.) on the beam of the radio base station, detected by the DL signal (DL broadcast channel) transmitted from the radio base station. Further, the control section 401 detects the best BS Tx beam from the received DL signal, and controls to obtain a beam index of the best BS Tx beam. Furthermore, the control section 401 controls to transmit the PRACH with the PRACH sequence that corresponds to the beam index of the best BS Tx beam and the beam index of the best UE Rx beam a plurality of times over a plurality of unit time segments. At this point, for example, by referring to the table shown in FIG. 10, the control section 401 identifies the PRACH sequence from the beam index.

Based on instructions from the control section 401, the transmission signal generating section 402 generates uplink signals (uplink control signal, uplink data signal, uplink reference signal, etc.) to output to the mapping section 403. The transmission signal generating section 402 is capable of being comprised of a signal generator, signal generating circuit or signal generating apparatus explained based on the common recognition in the technical field according to the present invention.

For example, based on instructions from the control section 401, the transmission signal generating section 402 generates the uplink control signal about receipt confirmation information and channel state information (CSI). Further, based on instructions from the control section 401, the transmission signal generating section 402 generates the uplink data signal. For example, when the downlink control signal notified from the radio base station 10 includes the UL grant, the transmission signal generating section 402 is instructed to generate the uplink data signal from the control section 401.

Based on instructions from the control section 401, the mapping section 403 maps the uplink signal generated in the transmission signal generating section 402 to radio resources to output to the transmitting/receiving section 203. The mapping section 403 is capable of being comprised of a mapper, mapping circuit or mapping apparatus explained based on the common recognition in the technical field according to the present invention.

The received signal processing section 404 performs reception processing (e.g. demapping, demodulation, decoding, etc.) on the received signal input from the transmitting/receiving section 203. Herein, for example, the received signal is the downlink signal (downlink control signal, downlink data signal, downlink reference signal, etc.) transmitted from the radio base station 10. The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

The received signal processing section 404 outputs the information decoded by the reception processing to the control section 401. For example, the received signal processing section 404 outputs the broadcast information, system information, RRC signaling, DCI and the like to the control section 401. Further, the received signal processing section 404 outputs the received signal and signal subjected to the reception processing to the measurement section 405.

The measurement section 405 performs measurement on the received signal. For example, the measurement section 405 performs measurement using RS for beam forming transmitted from the radio base station 10. The measurement section 405 is capable of being comprised of a measurement device, measurement circuit or measurement apparatus explained based on the common recognition in the technical field according to the present invention.

For example, the measurement section 405 may measure received power (e.g., RSRP), received quality (e.g., RSRQ, received SINR), channel state and the like of the received signal. The measurement result may be output to the control section 401.

(Hardware Configuration)

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g., by cable and/or radio), and each function block may be actualized by a plurality of these apparatuses.

Figure 17:
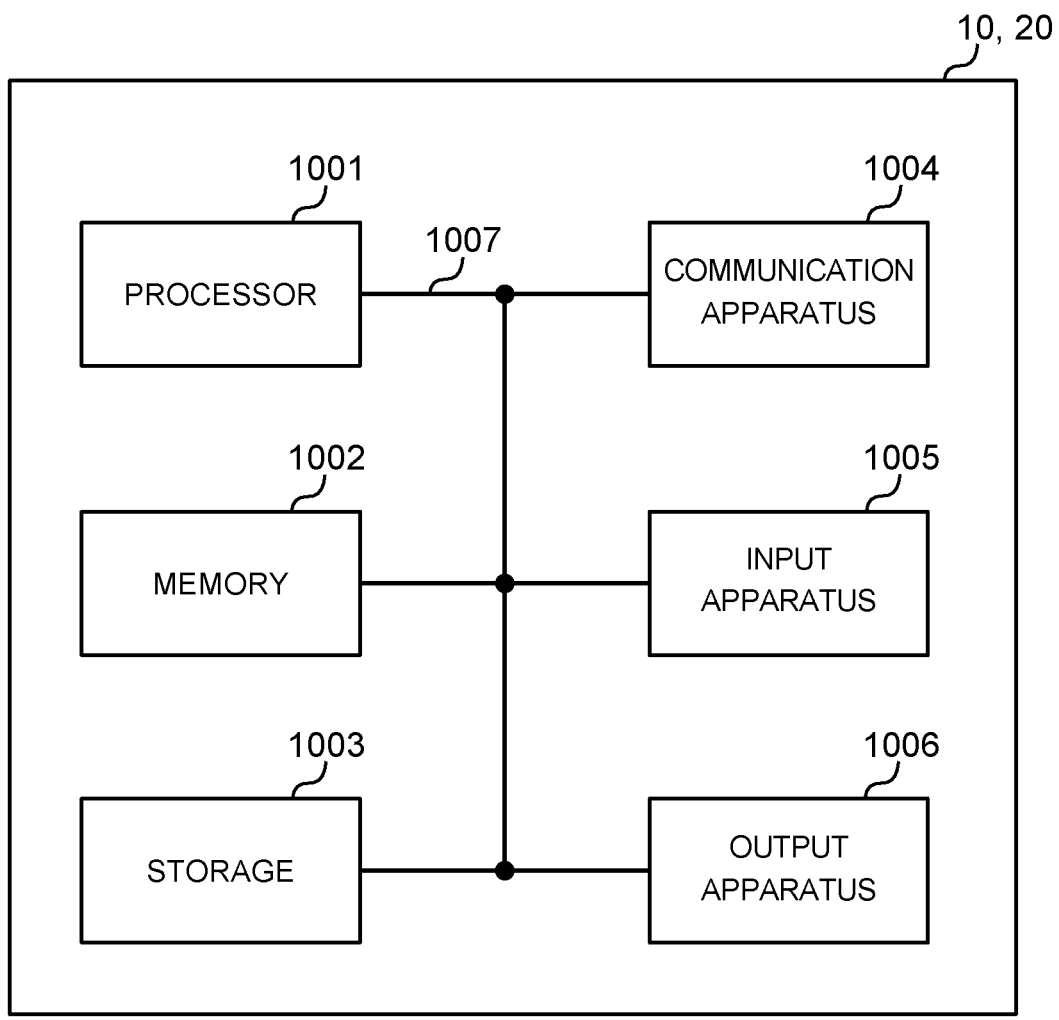
FIG. 17 is a diagram showing one example of hardware configurations of the radio base station and user terminal according to one Embodiment of the invention.

For example, each of the radio base station, user terminal and the like in one Embodiment of the present invention may function as a computer that performs the processing of the radio communication method of the invention. FIG. 17 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (ApplicatioN Specific Integrated Circuit), PLD (Programmable Logic Device), and FPGA (Field Programmable Gate Array), or a part or the whole of each function block may be actualized by the hardware. For example, the processor 1001 may be implemented by at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of one or a plurality of frames in the time domain. The one or each of the plurality of frames constituting the radio frame may be called a subframe. Furthermore, the subframe may be comprised of one or a plurality of slots in the time domain. Still furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain.

Each of the radio frame, subframe, slot and symbol represents a time unit in transmitting a signal. For the radio frame, subframe, slot and symbol, another name corresponding to each of them may be used. For example, one subframe may be called Transmission Time Interval (TTI), a plurality of contiguous subframes may be called TTI, or one slot may be called TTI. In other words, the subframe and TTI may be the subframe (1 ms) in existing LTE, may be a frame (e.g., 1 to 13 symbols) shorter than 1 ms, or may be a frame longer than 1 ms.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto. The TTI may be a transmission time unit of a data packet (transport block) subjected to channel coding, or may be a processing unit of scheduling, link adaptation and the like.

The TTI having a time length of 1 ms may be called ordinary TTI (TTI in LTE Rel. 8-12), normal TTI, long TTI, ordinary subframe, normal subframe, long subframe or the like. The TTI shorter than the ordinary TTI may be called shortened TTI, short TTI, shortened subframe, short subframe or the like.

The resource block (RB) is a resource allocation unit in the time domain and frequency domain, and may include one or a plurality of contiguous subcarriers in the frequency domain. Further, the RB may include one or a plurality of symbols in the time domain, and may have a length of 1 slot, 1 subcarrier, or 1 TTI. Each of 1 TTI and 1 subframe may be comprised of one or a plurality of resource blocks. In addition, the RB may be called a physical resource block (PRB: Physical RB), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, symbol and the like are only illustrative. For example, it is possible to modify, in various manners, configurations of the number of subframes included in the radio frame, the number of slots included in the subframe, the numbers of symbols and RBs included in the slot, the number of subcarriers included in the RB, the number of symbols within the TTI, the symbol length, the cyclic prefix (CP) length and the like.

Further, the information, parameter and the like explained in the present Description may be expressed by an absolute value, may be expressed by a relative value from a predetermined value, or may be expressed by another corresponding information. For example, the radio resource may be indicated by a predetermined index. Further, equations using these parameters and the like may be different from those explicitly disclosed in the present Description.

The names used in the parameter and the like in the present Description are not restrictive names in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed with a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiments described in the present Description, and may be performed by another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified by MAC Control Element (MAC CE).

Further, notification of predetermined information (e.g., notification of "being X") is not limited to notification that is performed explicitly, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating one or a plurality of (e.g. three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by an upper node thereof in some case. In a network comprised of one or a plurality of network nodes having the base station, it is obvious that various operations performed for communication with the terminal are performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile Communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description are not intended to limit the amount or order of these elements overall. These designations are capable of being used in the present Description as the useful method to distinguish between two or more elements. Accordingly, references of first and second elements do not mean that only two elements are capable of being adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., looking up in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. In the case of using in the present Description, it is possible to consider that two elements are mutually "connected" or "coupled", by using one or more electric wires, cable and/or print electric connection, and as some non-limited and non-inclusive examples, electromagnetic energy such as electromagnetic energy having wavelengths in a radio frequency region, microwave region and light (both visible and invisible) region.

In the case of using "including", "comprising" and modifications thereof in the present Description or the scope of the claims, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The present application is based on Japanese Patent Application No. 2016-192334 filed on Sep. 29, 2016, entire content of which is expressly incorporated by reference herein.

The invention claimed is:

1. A terminal comprising:
a receiver that receives a downlink signal, subject to beamforming, including a synchronization signal and a broadcast channel;
a processor that controls, based on a notified information, transmissions of random access channel corresponding to the downlink signal that use a time segment; and
a transmitter that transmits the random access channel, wherein
the notified information relates to a correspondence relationship between an index of the downlink signal and a sequence applied to the random access channel,
the transmitter transmits the random access channel using the sequence corresponding to the index, which is selected based on a measurement result of the downlink signal,
the transmitter transmits a plurality of random access channels in a plurality of the time segments based on the information, and
the processor applies different sequences to the plurality of random access channels that are respectively transmitted in a plurality of the time segments,
wherein the information relating to the correspondence relationship between the index of the downlink signal and the sequence applied to the random access channel is notified using a higher layer signaling.

2. A radio communication method comprising:
receiving a downlink signal, subject to beamforming, including a synchronization signal and a broadcast channel;
controlling, based on a notified information, transmissions of random access channel corresponding to the downlink signal that use a time segment; and
transmitting the random access channel, wherein
the notified information relates to a correspondence relationship between an index of the downlink signal and a sequence applied to the random access channel,
the random access channel is transmitted using the sequence corresponding to the index, which is selected based on a measurement result of the downlink signal,
a plurality of random access channels are transmitted in a plurality of the time segments based on the information, and
different sequences are applied to the plurality of random access channels that are respectively transmitted in a plurality of the time segments,
wherein the information relating to the correspondence relationship between the index of the downlink signal and the sequence applied to the random access channel is notified using a higher layer signaling.

3. A system comprising:
a base station comprising:
a transmitter that transmits a downlink signal, subject to beamforming, including a synchronization signal and a broadcast channel; and
a terminal comprising:
a receiver that receives the downlink signal, subject to beamforming, including the synchronization signal and the broadcast channel;
a processor that controls, based on a notified information, transmissions of random access channel corresponding to the downlink signal that use a time segment; and
a transmitter that transmits the random access channel, wherein
the notified information relates to a correspondence relationship between an index of the downlink signal and a sequence applied to the random access channel,
the transmitter of the terminal transmits the random access channel using the sequence corresponding to the index, which is selected based on a measurement result of the downlink signal,
the transmitter transmits a plurality of random access channels in a plurality of the time segments based on the information, and
the processor applies different sequences to the plurality of random access channels that are respectively transmitted in a plurality of the time segments,
wherein the information relating to the correspondence relationship between the index of the downlink signal and the sequence applied to the random access channel is notified using a higher layer signaling.

* * * * *